US010859390B2

(12) United States Patent
Fisher et al.

(10) Patent No.: US 10,859,390 B2
(45) Date of Patent: Dec. 8, 2020

(54) ELECTRIC VEHICLE CHARGING NETWORK SERVICES

(71) Applicant: Airbiquity Inc., Seattle, WA (US)

(72) Inventors: Sheldon Fisher, Sammamish, WA (US); Bheemrao Zhade, Redmond, WA (US)

(73) Assignee: Airbiquity Inc., Seattle, WA (US)

( * ) Notice: Subject to any disclaimer, the term of this patent is extended or adjusted under 35 U.S.C. 154(b) by 0 days.

(21) Appl. No.: 16/195,535

(22) Filed: Nov. 19, 2018

(65) Prior Publication Data

US 2019/0226860 A1  Jul. 25, 2019

Related U.S. Application Data

(60) Continuation of application No. 15/275,210, filed on Sep. 23, 2016, now Pat. No. 10,161,759, which is a
(Continued)

(51) Int. Cl.
*G01C 21/34* (2006.01)
*B60L 53/68* (2019.01)
(Continued)

(52) U.S. Cl.
CPC .......... *G01C 21/3469* (2013.01); *B60L 53/62* (2019.02); *B60L 53/66* (2019.02);
(Continued)

(58) Field of Classification Search
CPC .......... G01C 21/3469; G01C 21/3484; G01C 21/3415; G01C 21/3492; B60L 53/60;
(Continued)

(56) References Cited

U.S. PATENT DOCUMENTS 7,986,126 B1   7/2011 Bucci et al.
8,965,669 B2   2/2015 Fisher et al.
(Continued)

FOREIGN PATENT DOCUMENTS

CN   102024999 A   4/2011
CN   102189994 A   9/2011
(Continued)

OTHER PUBLICATIONS

Wang, Rui; Lukic, S.M.; "Review of driving conditions prediction and driving style recognition based control algorithms for hybrid electric vehicles"; Sep. 1, 2011; 2011 IEEE Vehicle Power and Propulsion Conference (pp. 1-7); 978-1-61284-248-6.
(Continued)

*Primary Examiner* — Brian P Sweeney
(74) *Attorney, Agent, or Firm* — Schwabe, Williamson & Wyatt, P.C.

(57) ABSTRACT

To provide remote services, including dynamic, interactive assistance to electric vehicle (EV) users, a central server is arranged for electronic communications with EVs (15) and with client devices (11). The server also communicates with at least one EV charging station network, which in turn communicate with individual charging stations (30). Remote services may include trip planning, locating charging stations, checking availability and suitability of charging stations, making reservations at charging stations, and updating plans en route. The server collects data from the EV and analyzes the data to determine various statistics. The system advises a user on readiness of the EV to complete a proposed trip before recharging the EV batteries. Client devices may include smart phones, computers, or a head unit in the EV. Application software programs are executable on the client devices to provide user interfaces for accessing the remote services and for communicating with the central server.

20 Claims, 28 Drawing Sheets

Related U.S. Application Data division of application No. 14/594,923, filed on Jan. 12, 2015, now Pat. No. 9,476,725, which is a division of application No. 13/736,805, filed on Jan. 8, 2013, now Pat. No. 8,965,669.

(60) Provisional application No. 61/584,688, filed on Jan. 9, 2012.

(51) Int. Cl.
| | | |
|---|---|---|
| *B60L 58/12* | (2019.01) | |
| *G06Q 10/04* | (2012.01) | |
| *B60L 53/60* | (2019.01) | |
| *B60L 53/67* | (2019.01) | |
| *B60L 53/62* | (2019.01) | |
| *B60L 53/66* | (2019.01) | |

(52) U.S. Cl.
CPC ............... *B60L 53/67* (2019.02); *B60L 53/68* (2019.02); *B60L 58/12* (2019.02); *G01C 21/3415* (2013.01); *G01C 21/3484* (2013.01); *G01C 21/3492* (2013.01); *G06Q 10/047* (2013.01); *B60L 2240/70* (2013.01); *B60L 2240/72* (2013.01); *Y02T 10/705* (2013.01); *Y02T 10/7005* (2013.01); *Y02T 10/7044* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/161* (2013.01); *Y02T 90/163* (2013.01)

(58) Field of Classification Search
CPC ...... B60L 58/12; B60L 53/68; B60L 2240/70; B60L 2240/72; B60L 53/67; B60L 53/62; B60L 53/66; G06Q 10/047; Y02T 90/161; Y02T 10/7291; Y02T 90/121; Y02T 10/7044; Y02T 10/705; Y02T 90/16; Y02T 90/163; Y02T 90/14; Y02T 90/128; Y02T 10/7088; Y02T 10/7005
USPC .......................................................... 701/414
See application file for complete search history.

(56) References Cited

U.S. PATENT DOCUMENTS

| | | |
|---|---|---|
| 9,476,725 B2 | 10/2016 | Fisher et al. |
| 2005/0274553 A1 | 12/2005 | Salman et al. |
| 2007/0208467 A1 | 9/2007 | Maguire et al. |
| 2008/0319642 A1 | 12/2008 | DeBie |
| 2010/0094496 A1 | 4/2010 | Hershkovitz et al. |
| 2011/0032110 A1 | 2/2011 | Taguchi |
| 2011/0191186 A1 | 8/2011 | Levy et al. |
| 2011/0224868 A1 | 9/2011 | Collings, III et al. |
| 2012/0179323 A1 | 7/2012 | Profitt-Brown et al. |
| 2013/0179057 A1 | 7/2013 | Fisher et al. |
| 2013/0179135 A1 | 7/2013 | Kang |
| 2013/0253740 A1 | 9/2013 | Kim |

FOREIGN PATENT DOCUMENTS

| | | |
|---|---|---|
| CN | 102192755 A | 9/2011 |
| EP | 2385349 A1 | 11/2011 |
| JP | 2011102739 A | 5/2011 |
| JP | 2011252816 A | 12/2011 |
| WO | 2012044447 A3 | 4/2012 |
| WO | 2013106345 A1 | 7/2013 |

OTHER PUBLICATIONS

European Patent Office (EPO); Extended EP Search Report EP 13736095.4; dated May 4, 2016; 9 pages.
International Search Report and Written Opinion for PCT/US2013/020697 dated Mar. 26, 2013; 8 pages.

FIG. 28

Please enter a place or address

666 Train Street, Seattle

Next

FIG. 29

Add Route Point | Add Charging Station

○ Your Car's Current Location
Charge: 23% Range: 11 mi 3.5 mi

Ⓐ 123 Main St
Maywood, IL 10.5 mi

Ⓑ Station Name
123 Main Street
Chicago, IL 16.9 mi

Ⓒ Home

Calculate Route

| Email | john@madeup.com |
| Country | United States ▼ |
| Time Zone | CST ▼ |
| Mobile | +1 (555) 123 4567 |
| Carrier | Verizon ▼ |
| Password | ••••••• |
| Confirm Password | ••••••• |

Apply Changes

FIG. 44

| Username | john1980 |
| Associated Vehicle | John's EV ▼ |
| Share Home Base | ✓ |
| Share Total Miles Driven | ✓ |
| Share Owned Since | ✓ |
| Share My Achievements | ✓ |
| Share My Driving Style | ✓ |

Apply Changes

Password

Confirm Password

Auto-Update ✓

Apply Changes

Delete Mobile App Account

FIG. 47

Station Name

Please provide your ChargePoint account credentials to make a reservation at this Charging Station.

Username

Password

Date

Tue, Nov 29 2011

Start Time

8 : 00  AM

ELECTRIC VEHICLE CHARGING NETWORK SERVICES

RELATED APPLICATIONS

This application is a continuation of U.S. patent application Ser. No. 15/275,210, filed on Sep. 23, 2016, which is a divisional of U.S. patent application Ser. No. 14/594,923, filed on Jan. 12, 2015, now issued as U.S. Pat. No. 9,476,725, which is a divisional of U.S. patent application Ser. No. 13/736,805, filed on Jan. 8, 2013, now issued as U.S. Pat. No. 8,965,669, which claims the benefit of U.S. provisional patent application Ser. No. 61/584,688 filed Jan. 9, 2012, and all are incorporated herein by this reference.

COPYRIGHT NOTICE

© 2012-2013 Airbiquity Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This invention pertains to methods and apparatus for networked electric vehicle (EV) user support services.

BACKGROUND OF THE INVENTION

Conventional technical schemes are available for assisting a driver in determining an appropriate time to "fill up" their vehicle. The conventional technical schemes typically involve a fuel gauge installed in the dashboard of a vehicle. The fuel gauge may have a full marking, an empty marking, other markings in between, and a needle indicating current fuel level relative to the markings. The gauge may also include a fuel light to activate when current fuel level reaches a preset fraction of maximum fuel. A driver can use the fuel gauge to determine an appropriate time to "fill up".

While these conventional technical schemes for assisting a driver in determining an appropriate time to "fill up" or refuel their vehicle, partially or completely, are typically sufficient for gasoline powered vehicles, electric vehicle usage is different than gasoline powered vehicle usage. In particular, electric vehicles considered as a whole typically have a shorter range (distance between "fill-ups") than gasoline powered vehicles. Electric vehicles typically require several hours to recharge, which is longer than the minutes needed to refuel a gasoline powered vehicle. Also, electric charging stations are not currently ubiquitous (as compared to gasoline stations). In view of the forgoing, a technical solution is needed to assist a driver of an electric vehicle in determining an appropriate time and place to recharge their vehicle battery.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

In one aspect, this disclosure describes a feature for EV users to reduce anxiety that may be caused by uncertainty as to whether or not an electric vehicle has sufficient charge to carry out its agenda for the remainder of the day. In other aspects, software analyzes a planned route, in view of a variety of information including but not limited to a history of prior usage data for the vehicle, driving style, planned route, current traffic conditions, and current charge or energy level of the vehicle batteries, to determine whether it will have sufficient range to complete the proposed trip.

In another aspect, the system provides information to a user regarding charging stations located either nearby or along a proposed route, for recharging the vehicle. Range analysis, mentioned above, combined with route planning and charging station data can be used to identify charging stations along the route, to check their suitability for the vehicle, to check their availability, and to make a reservation for charging at a selected charging station.

In a preferred embodiment, some user services and features are provided through communications between a "client" device in the car and a central server computer, further explained below. Preferably, the central server is arranged for communication with at least one charging station network.

Additional aspects and advantages of this invention will be apparent from the following detailed description of preferred embodiments, which proceeds with reference to the accompanying drawings.

BRIEF DESCRIPTION OF THE DRAWINGS

FIG. 28 is an example of a client application screen display arranged for user to enter a home address, which may be used as an anchor point or route point.

FIG. 29 is an example of a client application screen display showing a car's present location and status, and a series of route points for a trip.

FIG. 42 is an example of a client application screen display for managing a user's account and other operations.

FIG. 43 may be a continuation of FIG. 42 for maintaining a user profile.

FIG. 44 is a continuation of FIG. 43 for maintaining a user profile.

FIG. 45 is an example of a screen display regarding a user profile showing additional options.

FIG. 46 is an example of a screen display for updating a user password for a mobile application account.

FIG. 47 is an example of a client application screen display for making a reservation at a selected charging station.

DETAILED DESCRIPTION OF PREFERRED EMBODIMENTS

Figure 1:
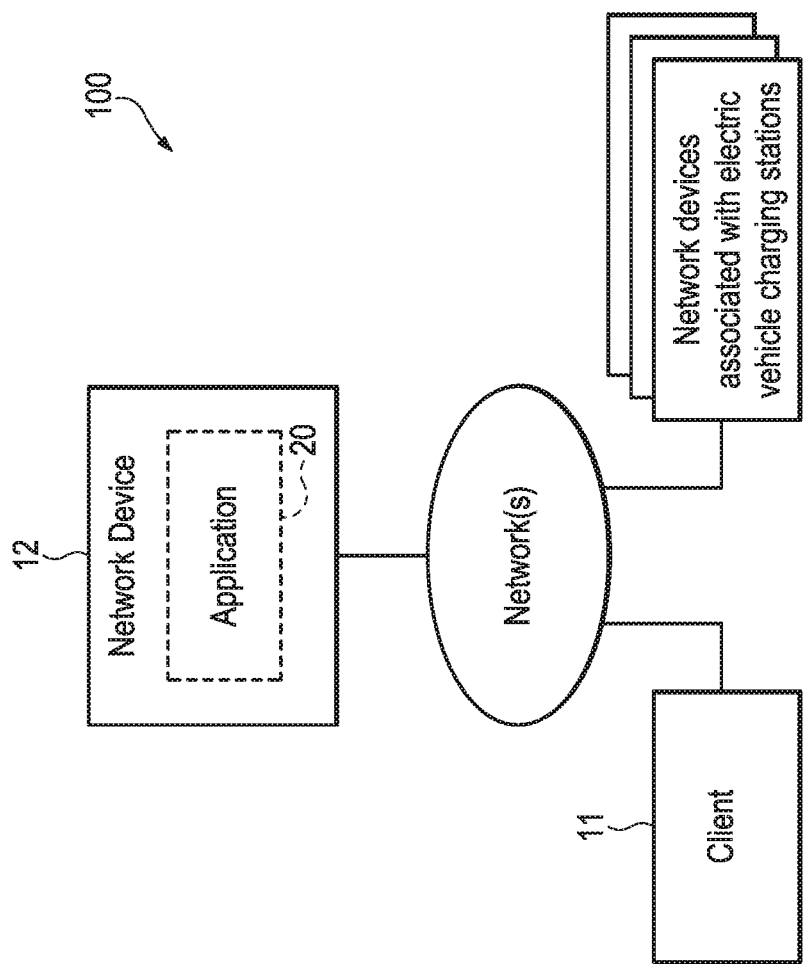
FIG. 1 is a simplified diagram illustrating a system to deliver driver services to operators of electric vehicles (EV).

FIG. 1 illustrates a system to assist a driver of an electric vehicle (15). For example, the system can be used for determining an appropriate time or place to recharge the vehicle battery. The system 100 includes a server 12, which may comprise one or more servers and other resources, wherever located. It has suitable means for communications over one or more networks, such as the Internet and/or a telecommunications network. It may communicate via a suitable gateway to a wireless telecommunications network. In some embodiments, the wireless telecommunications network may be used for server communications with a client device 11. In some cases, in-band signaling may be used for data communications during a voice channel call on the wireless telecommunications network. In some embodiments, a broadband or WiFi network may be used for server communications with a client device 11. Any or all of the above, as well as a wired network, POTS, cable, or other means not yet known may be used for server communications with other one or more EV charging station networks (not shown), which in turn may communicate with individual charging stations 30.

A client device 11 may comprise, in some embodiments, a personal portable device (cell phone, PDA, laptop, tablet computer, etc.), a vehicle "head unit," a desktop computer, or the like. The servers 12 typically include a memory device to store instructions that, if executed by a computing device, perform operations that will be described herein as operations of the server 12.

The server 12 may collect, from an electric vehicle or a computing device coupled to the electric vehicle, data for learning driving patterns. In a preferred embodiment, the server transmits a query or request to a wireless communication device embedded in the EV to acquire historical driving data. In an alternative embodiment, a client device 11 in or near the EV may be used to acquire the data and transmit it to the server. The server 12 generates a driving history based on the collected data. The server 12 may store the driving history in a database. The database may be organized, for example, as a plurality of entries or records, each indicating a particular driving trip of the subject vehicle. Data may be aggregated over a fleet of vehicles.

A trip record may include, for example, a distance traveled by the electric vehicle, how much energy was used by the electric vehicle during the trip, and a time stamp indicating a date and time that the trip started and/or ended. Additional information in a trip record may include a route, start and stop locations, way points, traffic data and or topological data. It may include weather conditions or temperature, traffic conditions and other variables. A detailed record may include periodic speed readings.

The server 12 analyzes the database entries. In one example, the server 12 may identify patterns based on the database entries, i.e. a difference between certain days of the week vs. other days of the weeks, which has some consistency across weeks, i.e. observing that 18 kilowatt hours are typically used on Wednesday while 15 kilowatt hours are typically used on a Thursday.

In one example, if a pattern is identified, the analysis may include the server 12 interfacing with a calendaring application to determine future trips that would skew an expected usage based on an identified pattern. The server 12 may check the appointment for address information. However, if the appointment lists a person but not address information, the server 12 may obtain address information listed for the person from the appointment using contacts or some other database.

In one example, the server 12 may determine an expected energy usage for a time period to occur based on the analysis. The determination can consider parameters such as temperature, weather conditions, characteristics of expected travel when they vary from historical travel (such as the use of a hilly route or a high speed freeway that are not normally used), traffic, tire pressure, vehicle load (number of passengers), or other variables. In one example, the determination may include comparing a current or expected temperature for the time period with an average temperature based on prior corresponding time periods. Energy usage may be higher than expected from the identified pattern if the day is unusually cold, for example, because a driver may be expected to utilize the vehicle's heater more than usual. Conversely, in hot weather the air conditioning will have a similar impact. HVAC in general requires energy from the batteries. Also, weather forecasts or current conditions can also be used in the determination. For example, expected energy usage may be different than expected based on an identified pattern if there is currently snow on the ground or other weather conditions that could affect frictional coefficients of the tires of the electric vehicle.

The server 12 may generate a presentation for a driver of the electric vehicle based on the determination. The generated presentation is to be displayed using the client 11 (in one example the generated presentation may be displayed on a visual and/or audio display of a vehicle head unit of the electric vehicle).

Figure 3:
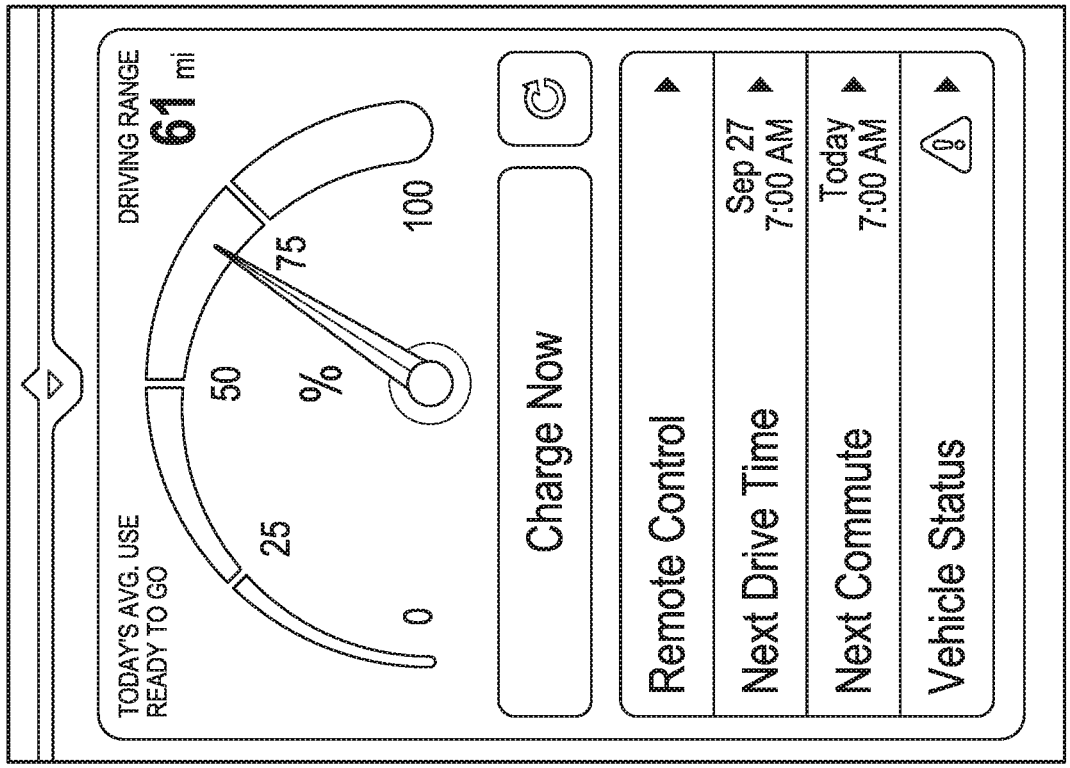
FIG. 3 is an example of a client application screen display indicating a readiness status of the electric vehicle.

The generated presentation may indicate whether the amount of energy currently stored in the battery of the electric vehicle is greater than the expected energy usage for a particular time period, e.g. the rest of the day, based on the determination. In one example, the generated presentation specifies that the driver is "Ready To Go"™ ("Ready to Go" is a trademark of Airbiquity Inc.) if the amount of energy currently stored in the battery of the electric vehicle is greater than the expected energy usage for the rest of the day. In an embodiment the determination may be made not for the whole day, but for the morning commute to work, for example, or return home from the office. A screen for the example described in the immediately preceding paragraph is shown in FIG. 3. The shading extending from 0 to below 50% represents the determination of energy usage for the day. The dial indicates energy available in the battery.

Figure 2:
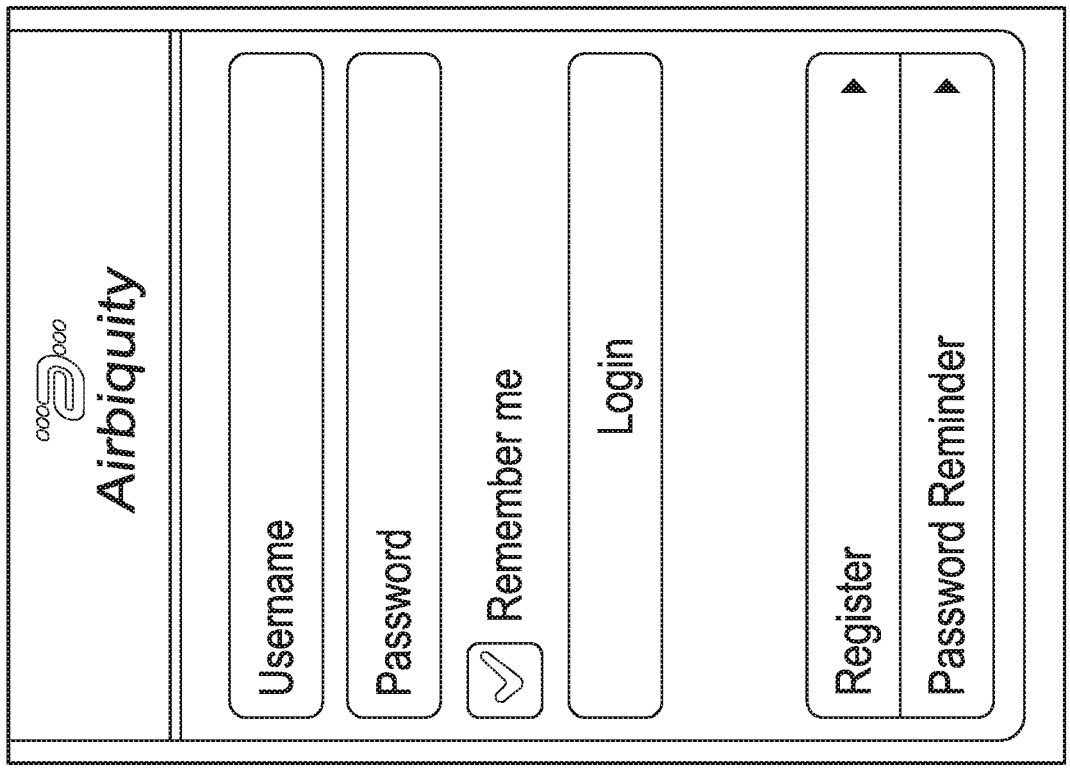
FIG. 2 is an example of a screen display for login to a client application consistent with the present disclosure.

FIG. 2 is an example of a screen display for login to a client application consistent with the present disclosure. In this example, the login screen is shown for a smart phone type of portable device. Suitable applications or "apps" may be provided for various different client devices as noted, and a similar application may be deployed on a vehicle head unit. In FIGS. 3-53, a smart phone or iPhone display screen is used by way of illustration and not limitation. Any display, including a windshield "head up" display, may be used.

Referring again to FIG. 1, the server 12 may store an application 20 to be downloaded to a personal portable device for operation thereon. In one example, the application 20 is downloaded to a personal portable device, such as a mobile phone. The personal portable device operating the application can remotely control a component of the vehicle.

In one example, the downloaded application causes the screen shown in FIG. 3 to be displayed on the personal portable device. The "charge now button" causes the personal portable device to transmit a signal that causes the electric vehicle to begin charging (so long as the electric vehicle is plugged in to a utility power source). Other components of the vehicle may be controlled using the Remote Control feature further described below.

Figure 4:
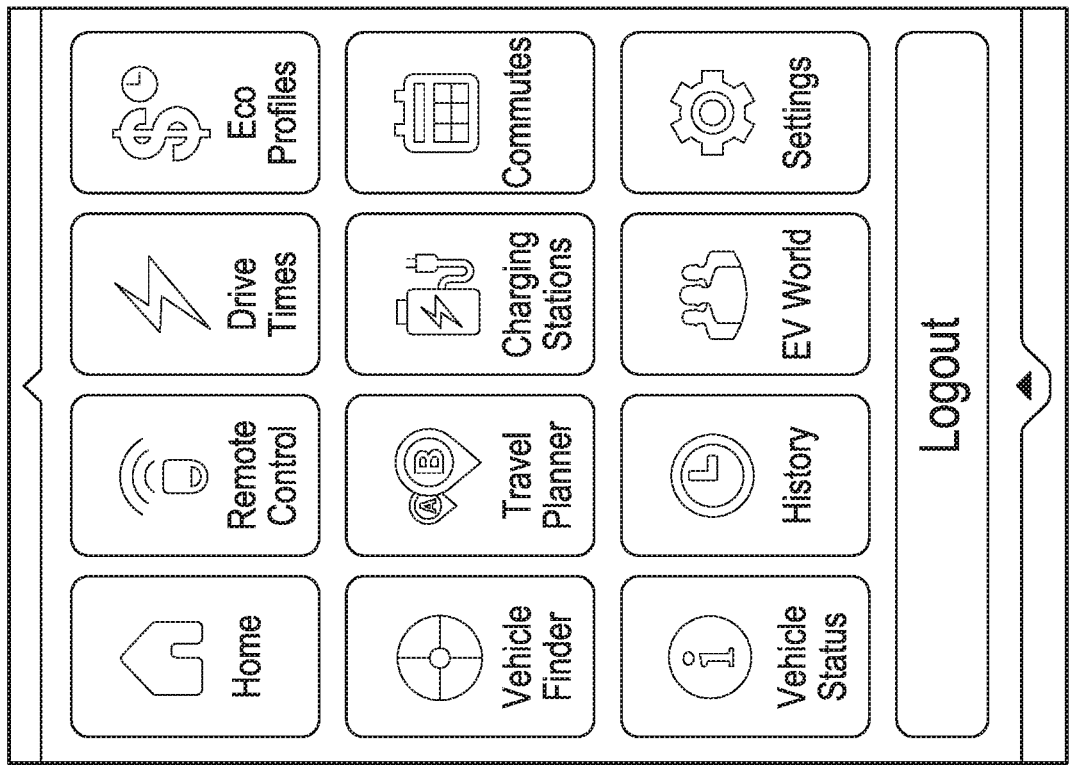
FIG. 4 is an example of a client application screen display showing icons corresponding to a variety of available user services and features.

FIG. 4 is an example of a client application screen display showing icons corresponding to a variety of available user services and features. Other features may be added or removed. For example, new applications later developed may be downloaded from the server and installed on the client device.

Figure 5:
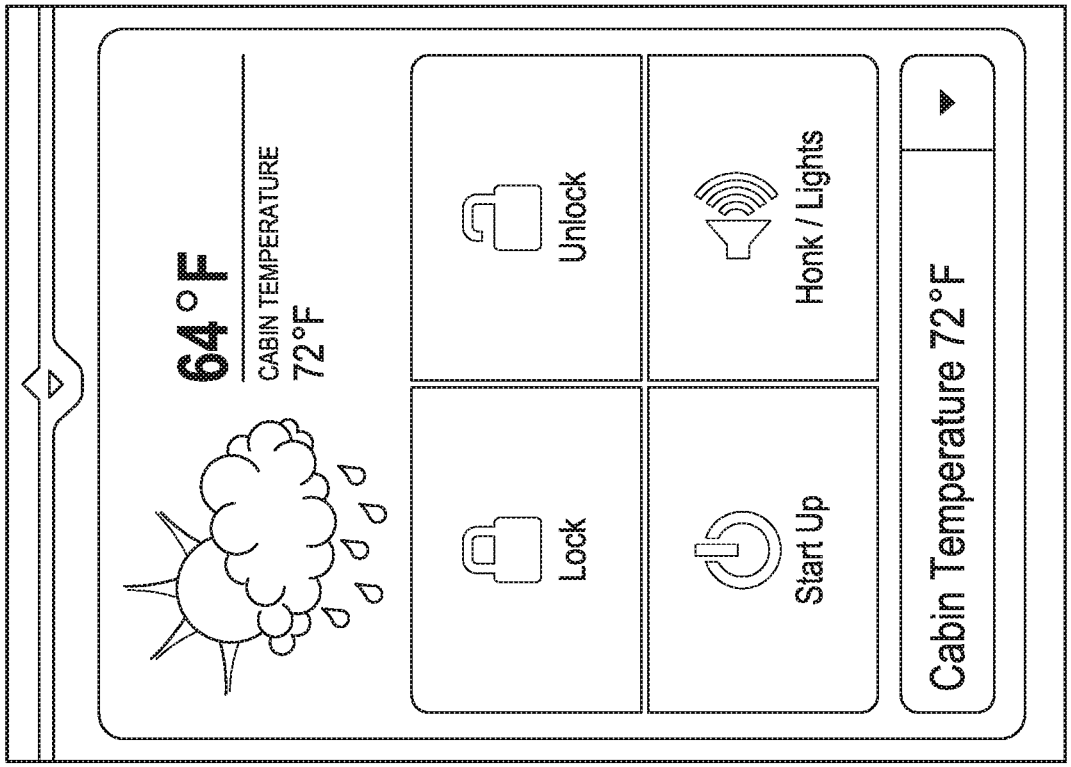
FIG. 5 is an example of a client application screen display showing examples of remote control features.

FIG. 5 is an example of a client application screen display showing examples of remote control features. These may include operation of vehicle door locks, horn, lights, and motor startup or stop. The remote control may indicate current cabin temperature, and may enable remote control of heating or cooling operations to condition to cabin temperature prior to user boarding.

Figure 7:
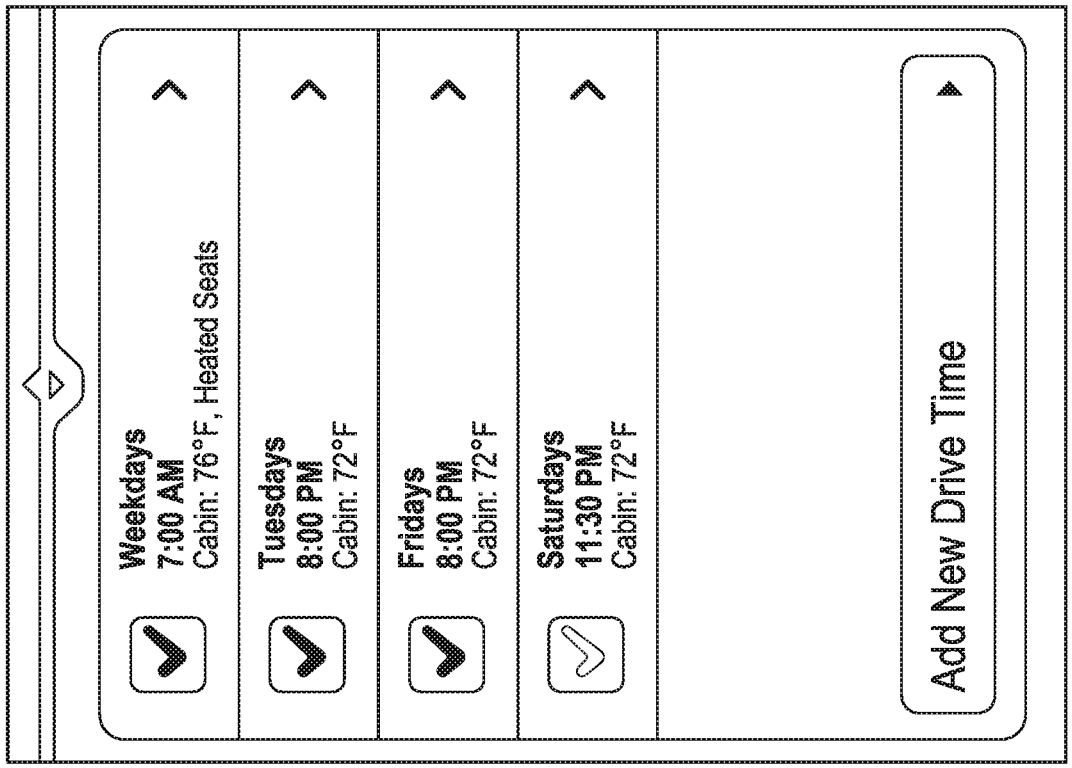
FIG. 7 shows an example of a listing of drive times by day of the week.
Figure 6:
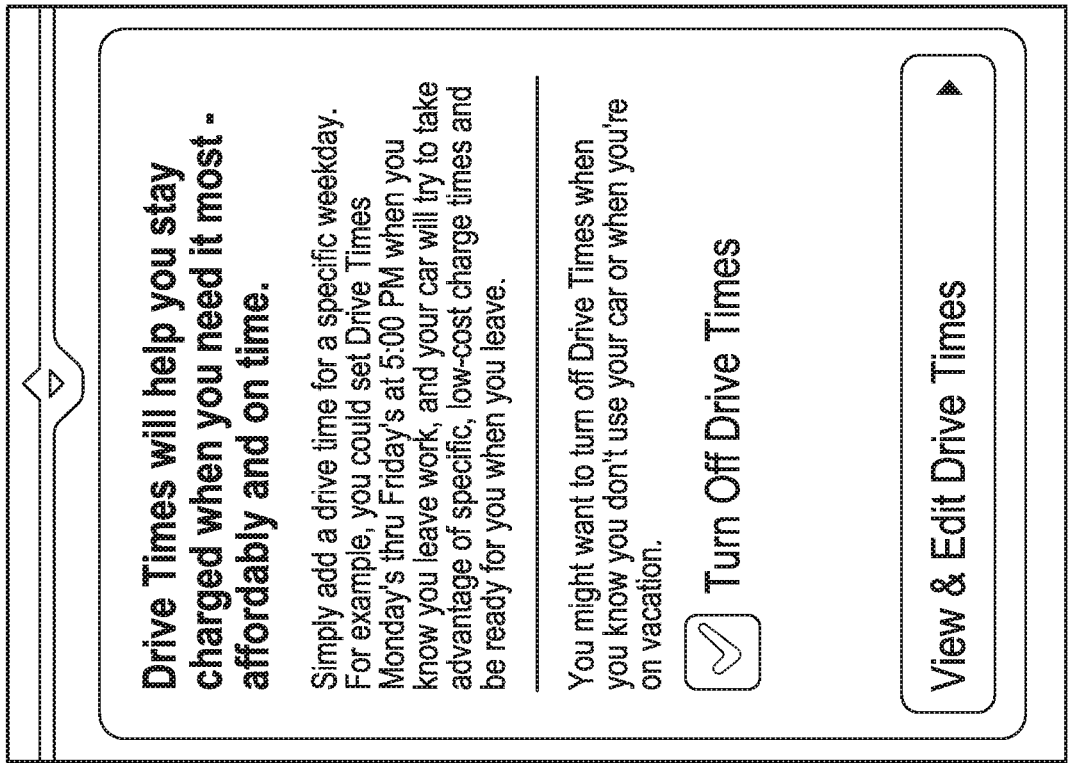
FIG. 6 is an example of a client application screen display regarding specification of drive times.

FIG. 6 is an example of a client application screen display for utilizing a feature that may be called Drive Times. This enables a user to specify regular or repeating "drive times" or trips. For example, a commute between home and work locations may define a drive time. The times, days of the week and locations may be "programmed" and stored. If a car is plugged into a charger at work all day, for example, it may try to take advantage of variations in charging cost (prices) if it needs charging for only, say one hour. FIG. 7 shows an example of a listing of drive times by day of the week. It also shows a desired cabin temperature for departure time. The remote control feature may utilize this information to begin pre-heating the cabin if necessary in advance of the scheduled departure or "drive time." A button at the bottom of the screen enables adding a new drive time; it may be used to invoke a screen display like that shown in FIG. 8.

Figure 9:
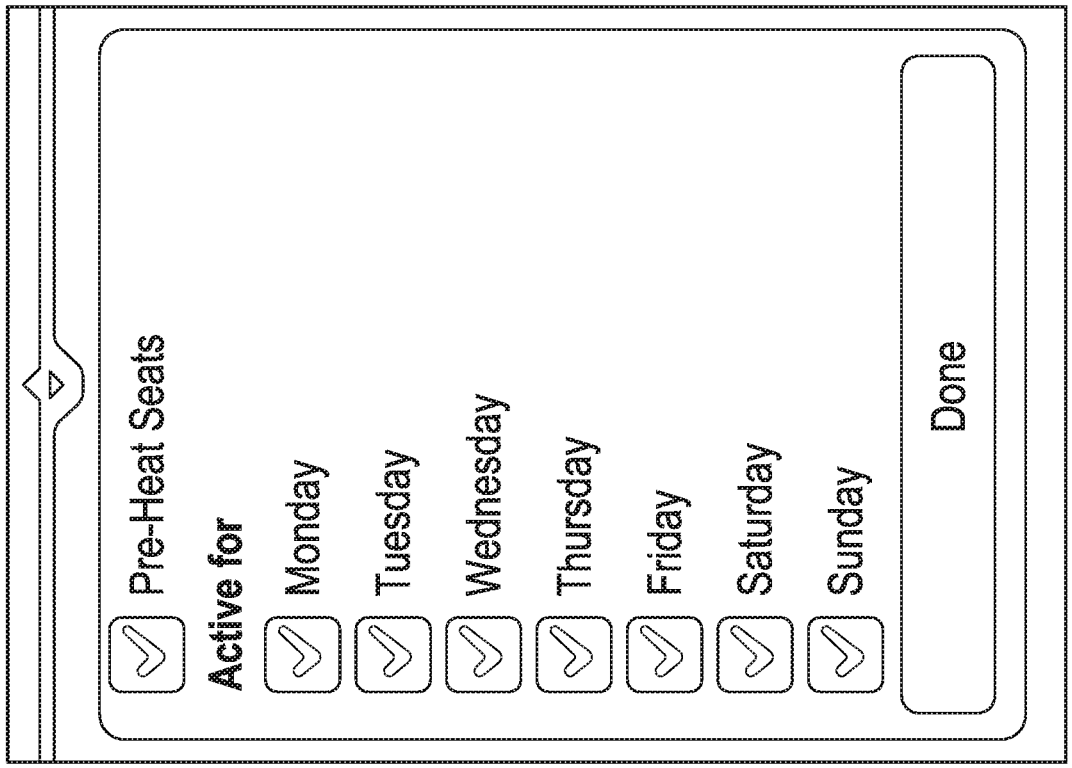
FIG. 9 is a continuation of the screen display of FIG. 8, which may be accessed by scrolling.
Figure 8:
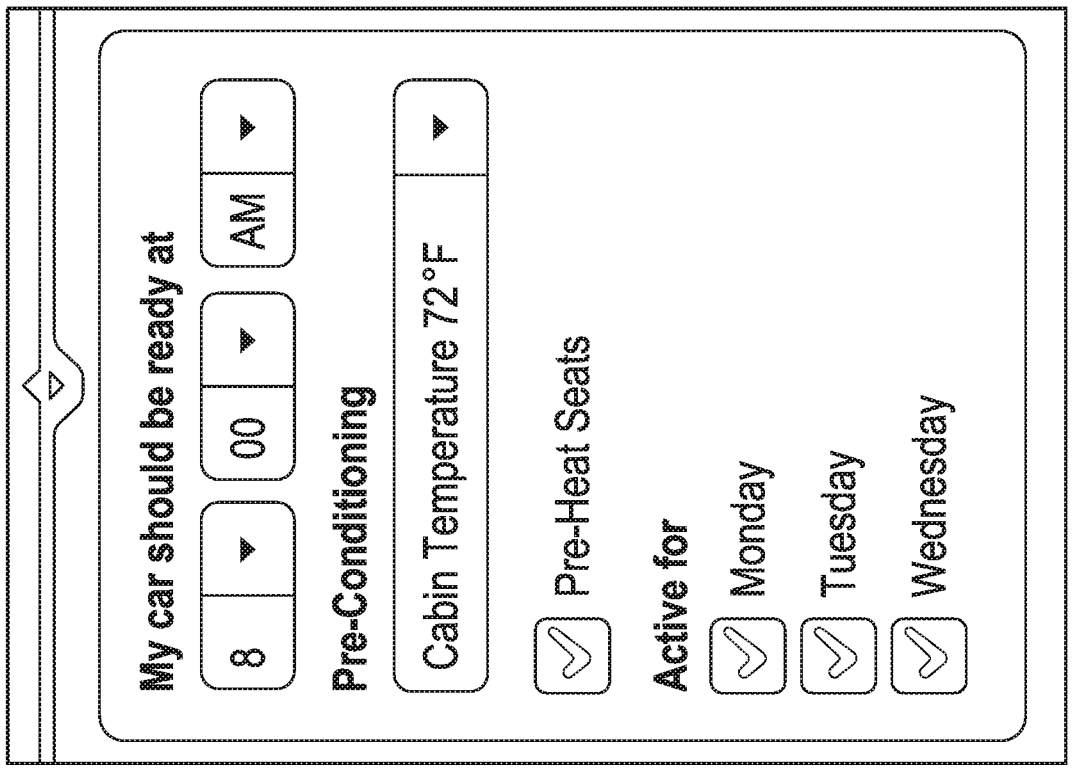
FIG. 8 is an example of a client application screen display for adding or "programming" a drive time.

FIG. 8 is an example of a client application screen display for adding a new drive time. A time of day is specified, and days of the week are selected. Optional pre-conditioning of the cabin may be selected, as well as pre-heating seats. FIG. 9 is a continuation of the screen display of FIG. 8, which may be accessed by scrolling. It shows check boxes for selecting days of the week for the subject drive time. See discussion of commutes below with regard to FIG. 38.

Figure 11:
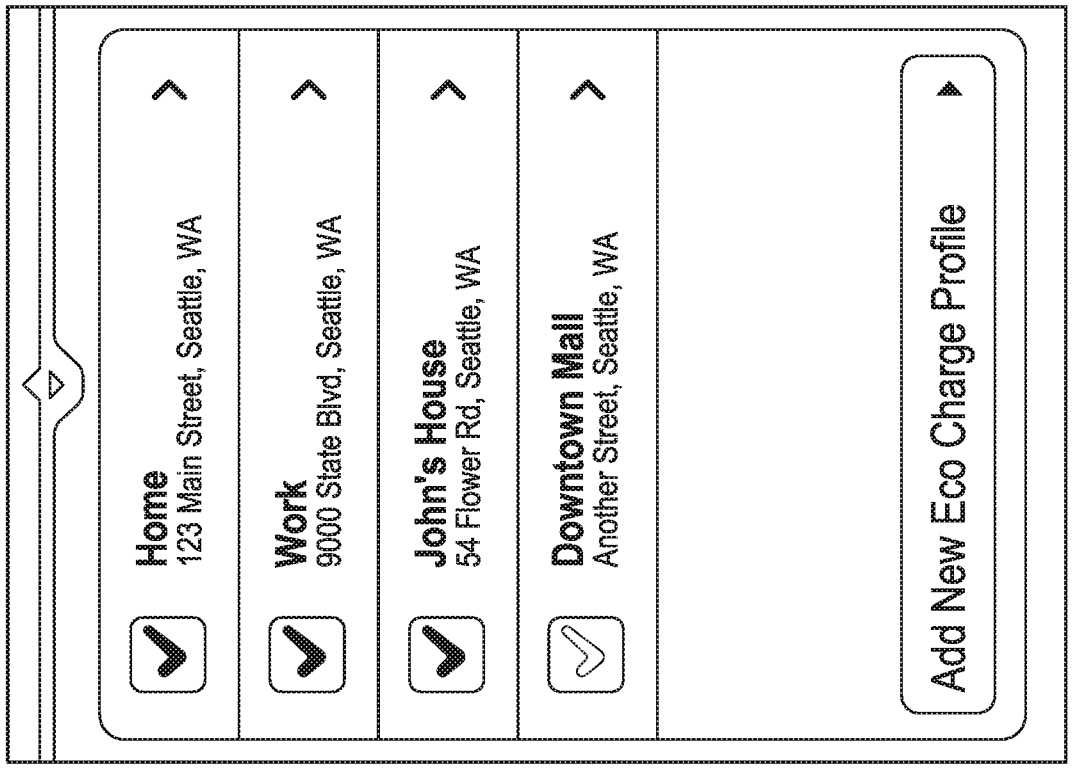
FIG. 11 is an example of a client application screen display showing a listing of eco-charge profiles per location.
Figure 10:
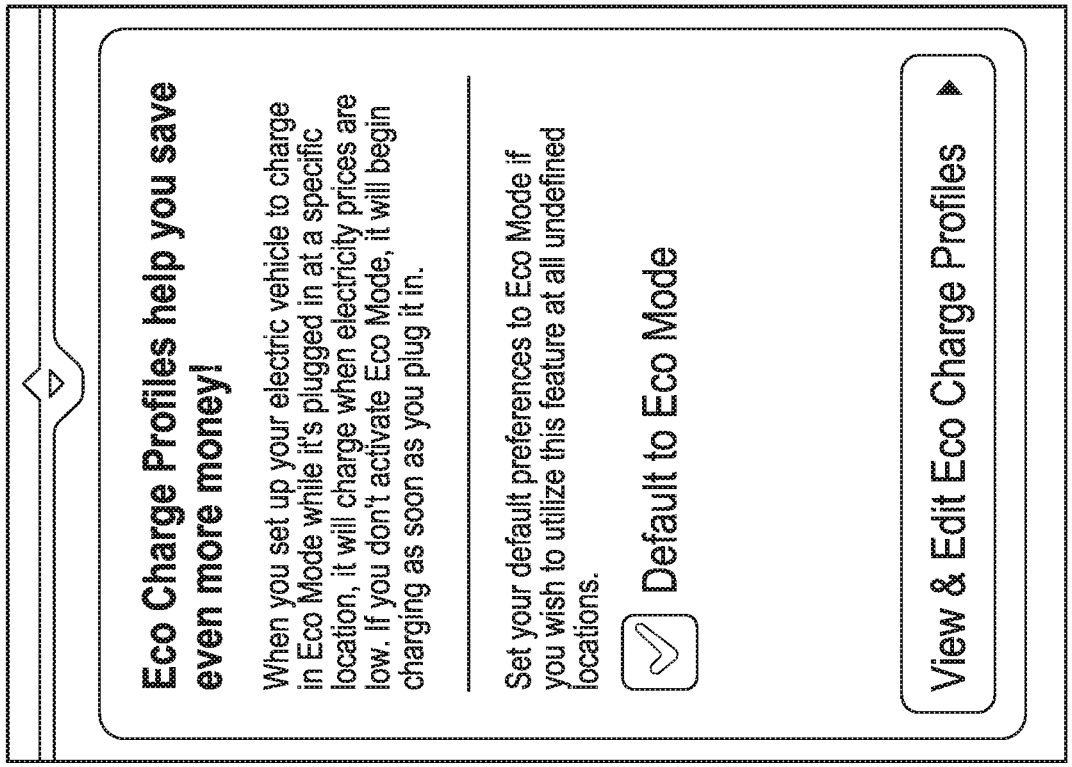
FIG. 10 is an example of a client application screen display regarding eco-charge profiles, to take advantage of variation in electricity prices for charging an electric vehicle.
Figure 12:
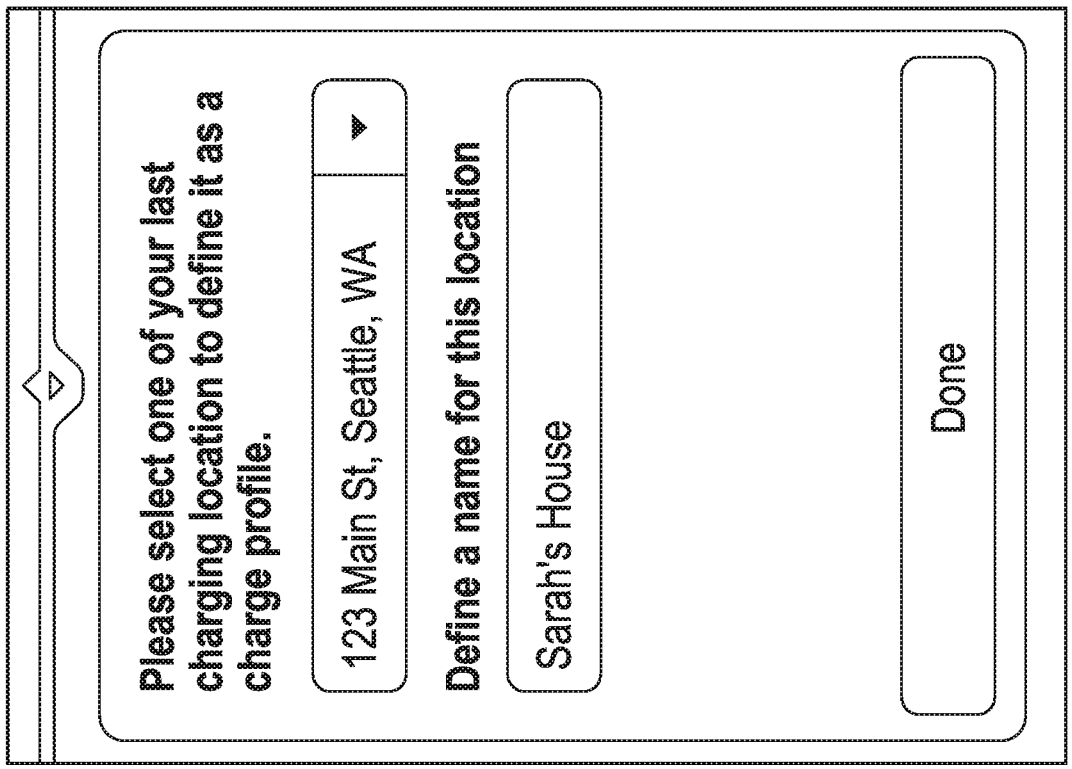
FIG. 12 is an example of a client application screen display for selecting a charging location to define a charge profile.

FIG. 10 is an example of a client application screen display regarding "Eco-Charge Profiles," a feature designed to take advantage of variations in electricity pricing for charging an electric vehicle. Each profile may be associated to a specific location where charging is available. FIG. 11 is an example of a client application screen display showing a listing of eco-charge profiles per location. A button at the bottom enables adding a new location. FIG. 12 is an example of a client application screen display for selecting a charging location to define a charge profile, and assigning a name to the location.

Figure 13:
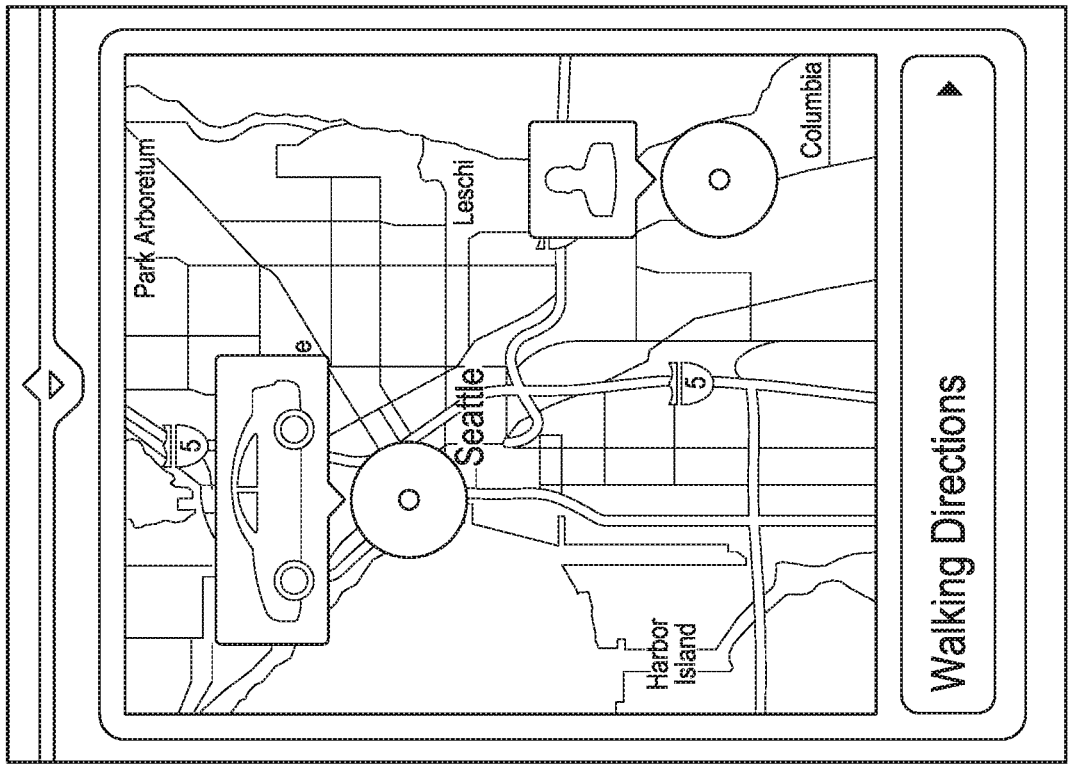
FIG. 13 shows an example of a client application screen display comprising a map showing the user's current location and a current location of the electric vehicle.
Figure 15:
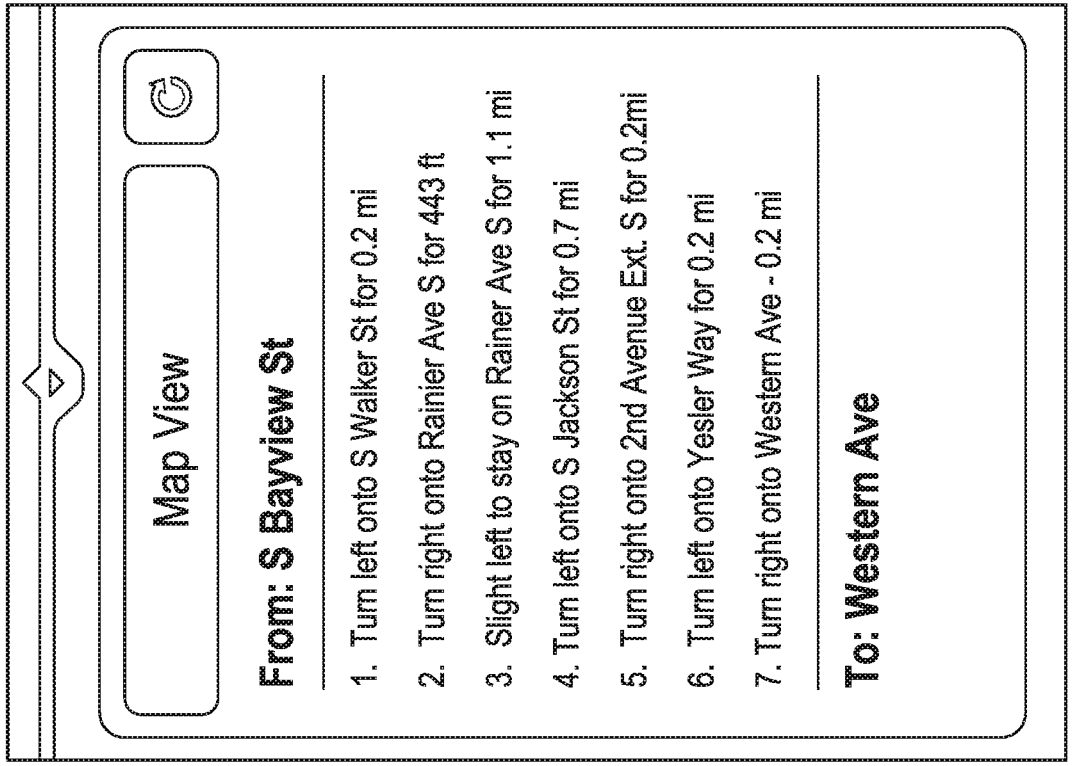
FIG. 15 is an example of a client application screen display showing the suggested route of FIG. 14 in a list view.
Figure 14:
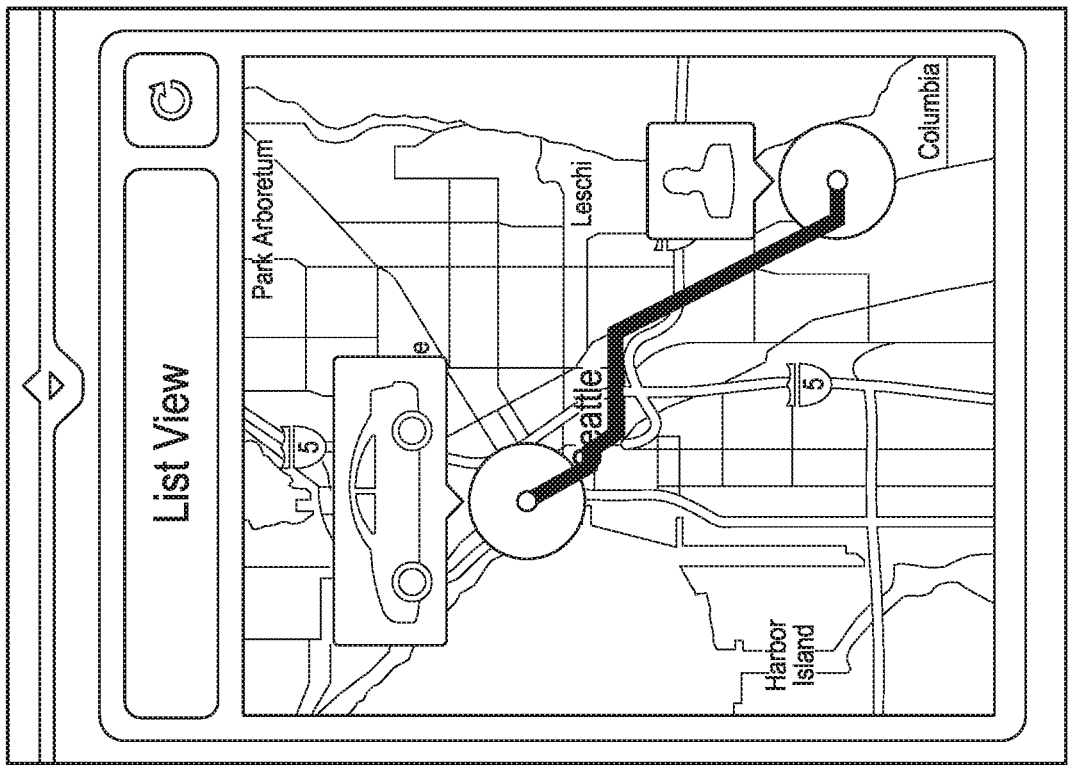
FIG. 14 is an example of a client application screen display showing a suggested route on a map for walking from the user's current location to the current location of the electric vehicle.

FIG. 13 shows an example of a client application screen display comprising a map showing the user's current location, and a current location of the electric vehicle. A button at the bottom of the screen display may be used to request walking directions to the vehicle. FIG. 14 is a map display showing a suggested route for walking from the user's current location to the current location of the electric vehicle. The current location of the vehicle may be obtained in various ways, for example, by querying the vehicle (from the server or the handheld client), or accessing a stop location from the last trip history database record, or a temporary data buffer. Further, a stop location can also be recorded via the portable device (with GPS) manually by the user or automatically when the vehicle is Key-Off. A button at the top of the display enables toggling to a list view of the suggested route. FIG. 15 shows the suggested walking route of FIG. 14 in a list view.

Travel Planning for EV

Figure 17:
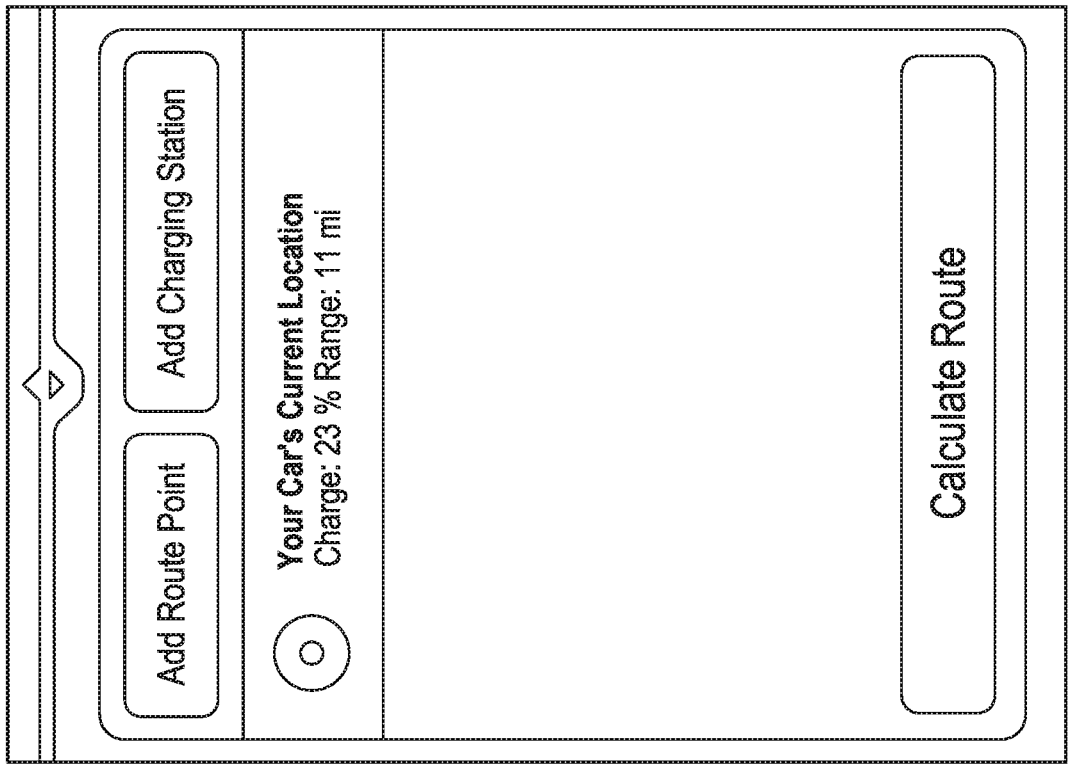
FIG. 17 shows an example of a client application screen display for adding a route point or adding a charging station for planning a trip.
Figure 16:
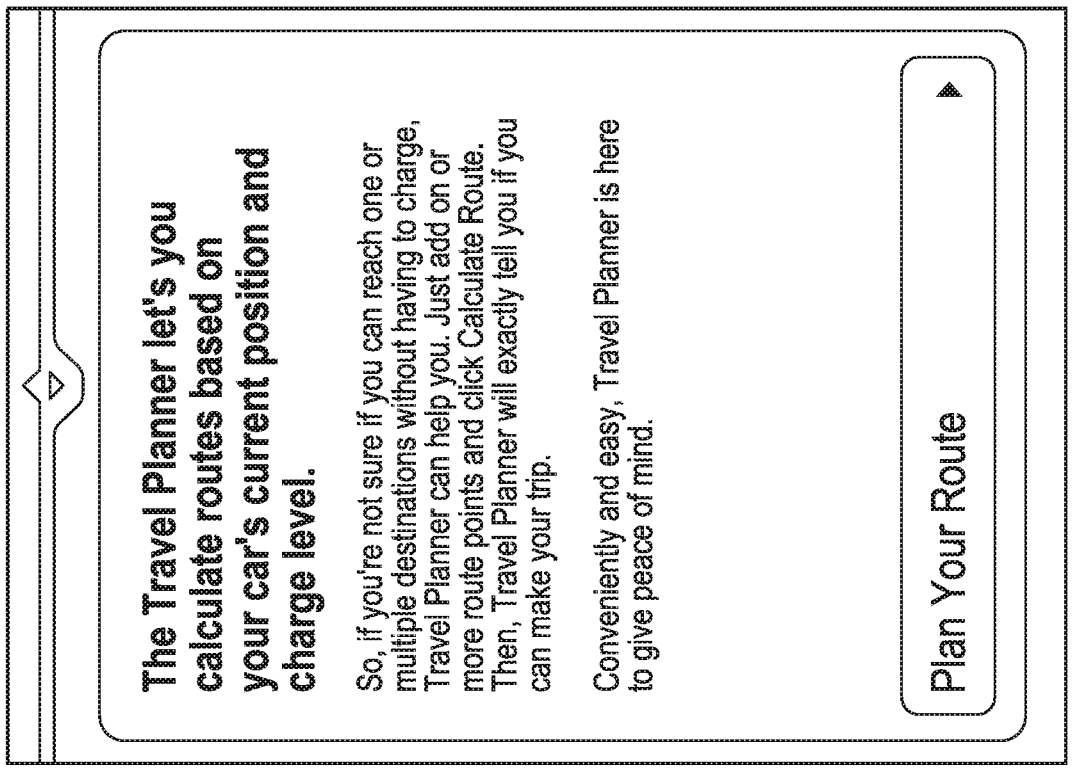
FIG. 16 is an example of a client application screen display for a travel planner feature.
Figure 19:
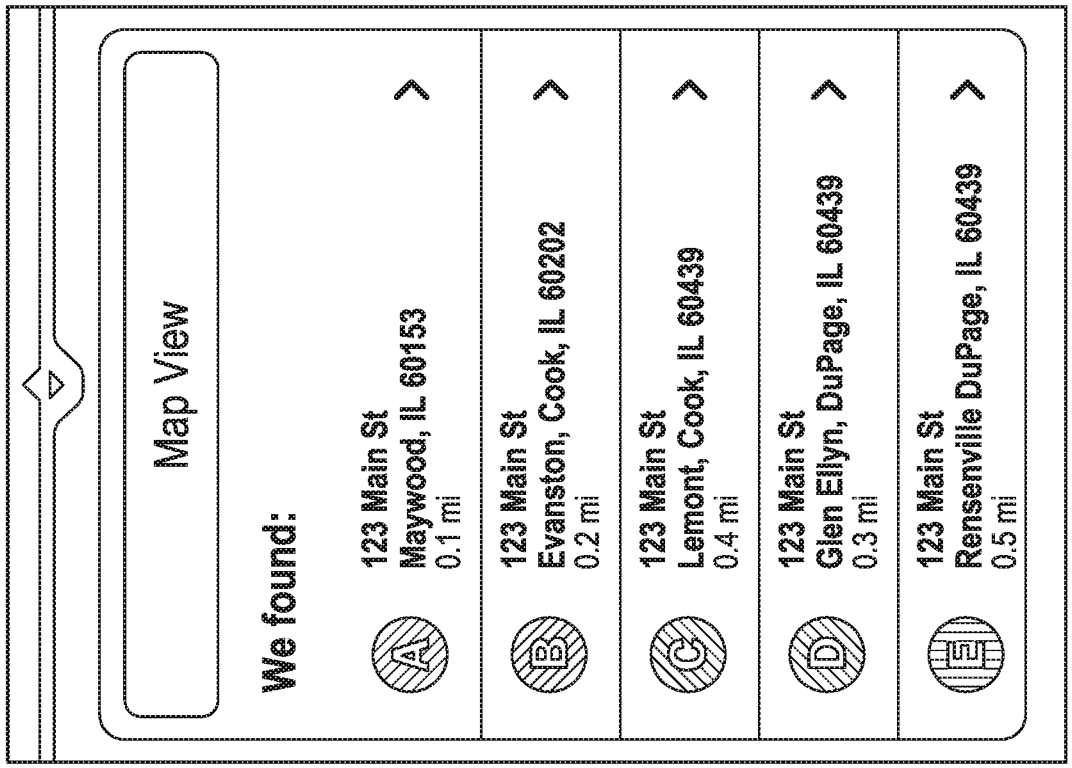
FIG. 19 shows a listing of locations that were found based on the data entered in FIG. 18.
Figure 18:
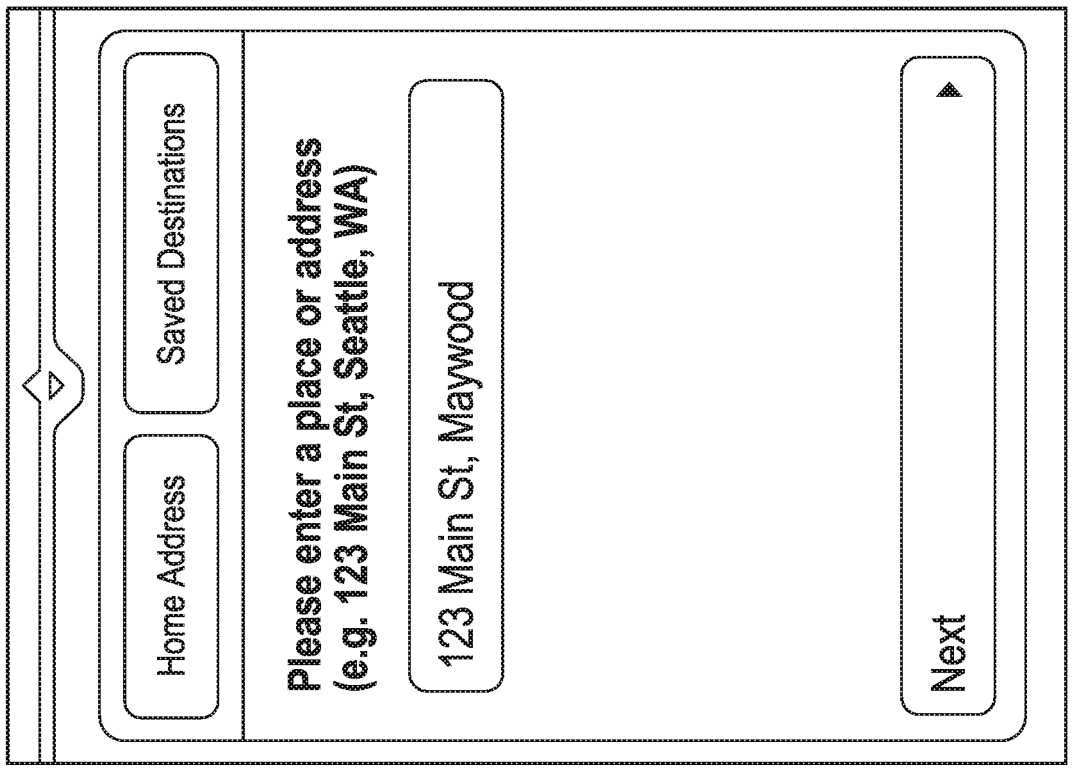
FIG. 18 is an example of a client application screen display for entering a place or address as part of planning a trip.

FIG. 16 is an example of a client application screen display for a travel planner feature. The travel planner may be used to calculate routes based on current location and taking into account the vehicle charge level. If necessary, a route may be modified in order to visit a charging station along the way. FIG. 17 shows an example of a client application screen display for adding a route point or adding a charging station for planning a trip. The display may include indications of the car's current location, charge level and estimated range. Planning a trip may involve the following display screen interactions. FIG. 18 is an example of a client application screen display for entering a place or address as part of planning a trip. FIG. 19 shows a listing of locations that were found based on the data entered in FIG. 18. In FIG. 19, the listed locations preferably are color coded, or some other indicator provided, to indicate whether the vehicle is capable of reaching the location based on current location and charge level. For example, green color may be used to indicate that the vehicle can reach the corresponding location; yellow may be used to indicate the vehicle probably can reach the location, but that is not certain; and red may be used to indicate the corresponding location is out of range. A button may be provided to switch to map view.

Figure 21:
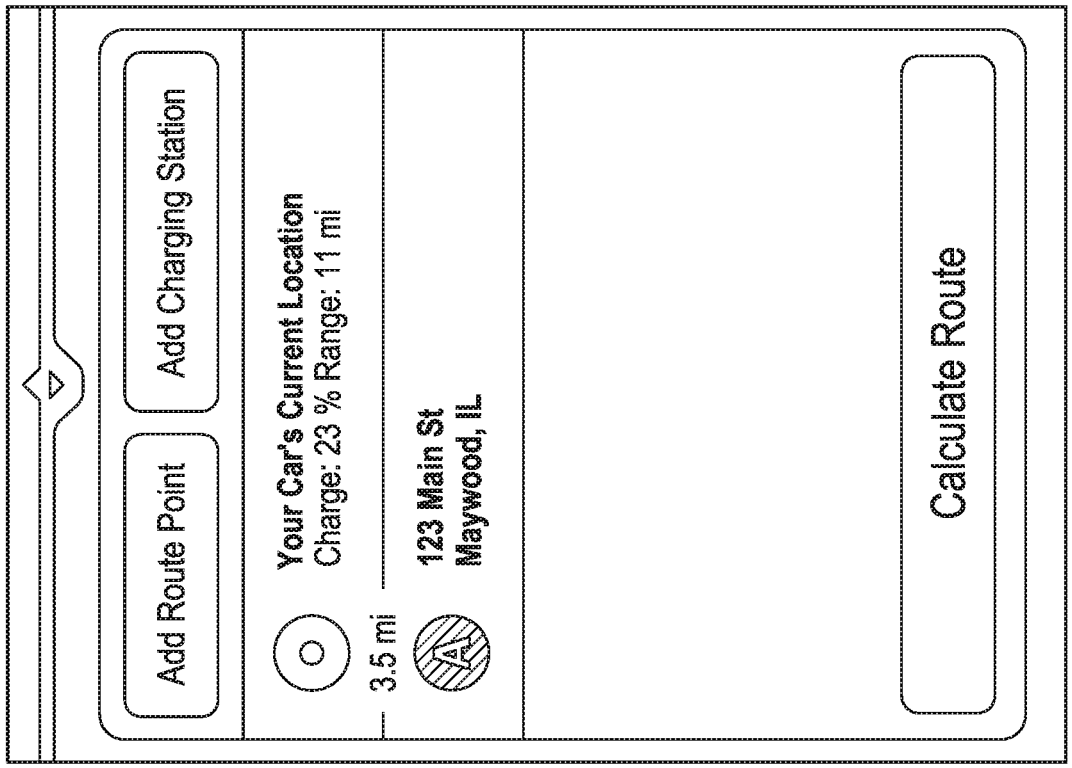
FIG. 21 is an example of a client application screen display showing the EV current location and status, along with the selected route point.
Figure 20:
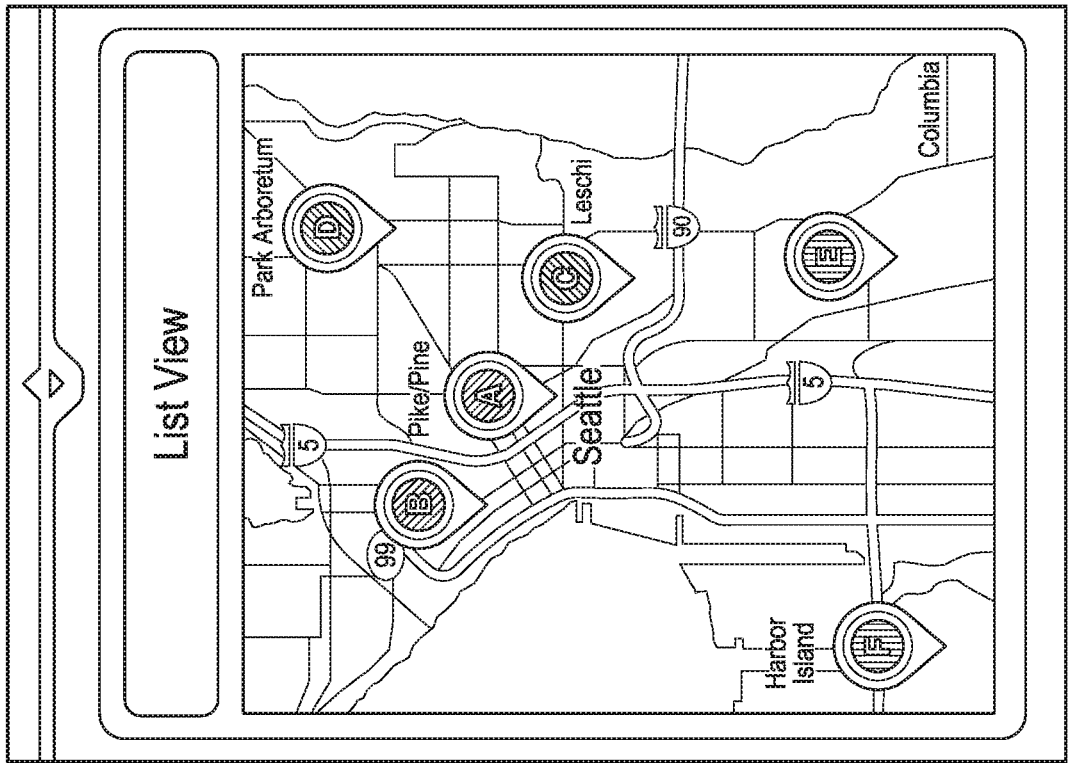
FIG. 20 is a an example of a map display showing the locations that are listed in the screen display of FIG. 19, enabling user selection of a desired location or route point by touching the screen at the corresponding location indicator.

FIG. 20 is a map display showing the locations that are listed in the screen display of FIG. 19, enabling user selection of a desired location or route point by touching the screen at the corresponding location indicator. Preferably, the locations are color coded on the map as described with regard to FIG. 19. Referring now to FIG. 21, the user has selected a location (from the list or the map view), and the selected route point is now listed, again color coded, with an indication of the distance to that route point. The process can be repeated to identify and select additional route points to add to the trip. When ready, the user can press the "Calculate Route" button at the bottom to obtain a recommended route.

Charging Stations

Figure 23:
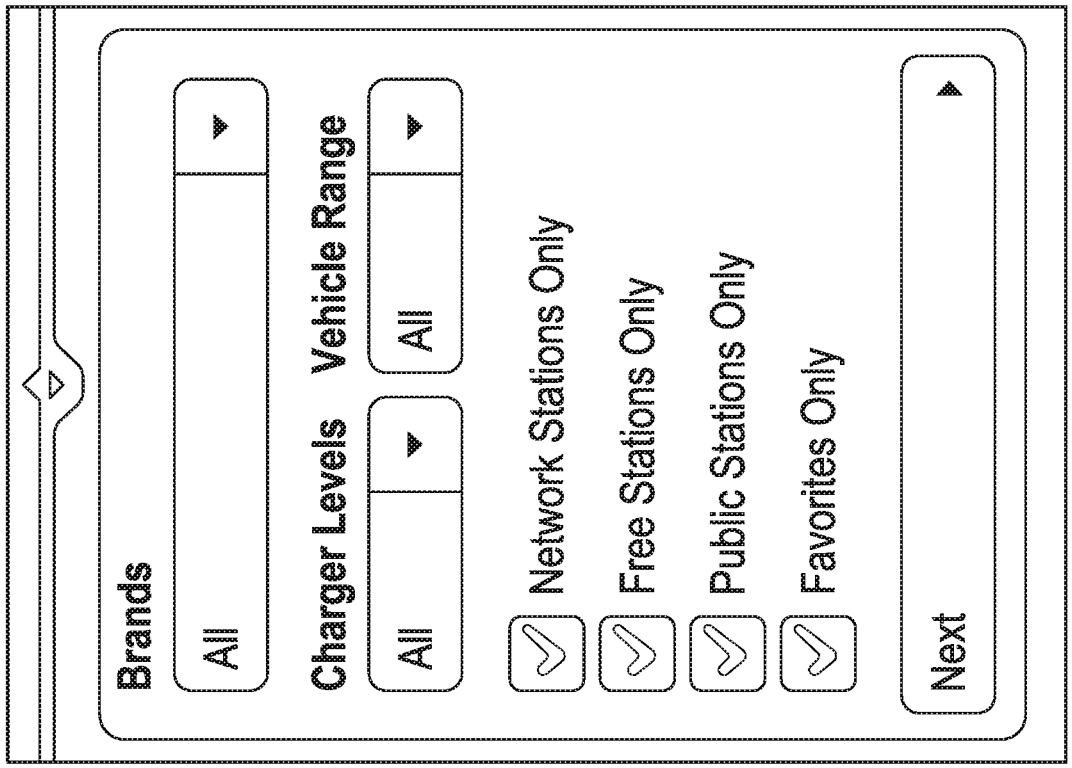
FIG. 23 is a continuation of the screen display of FIG. 22 which may be accessed, for example, by scrolling.
Figure 22:
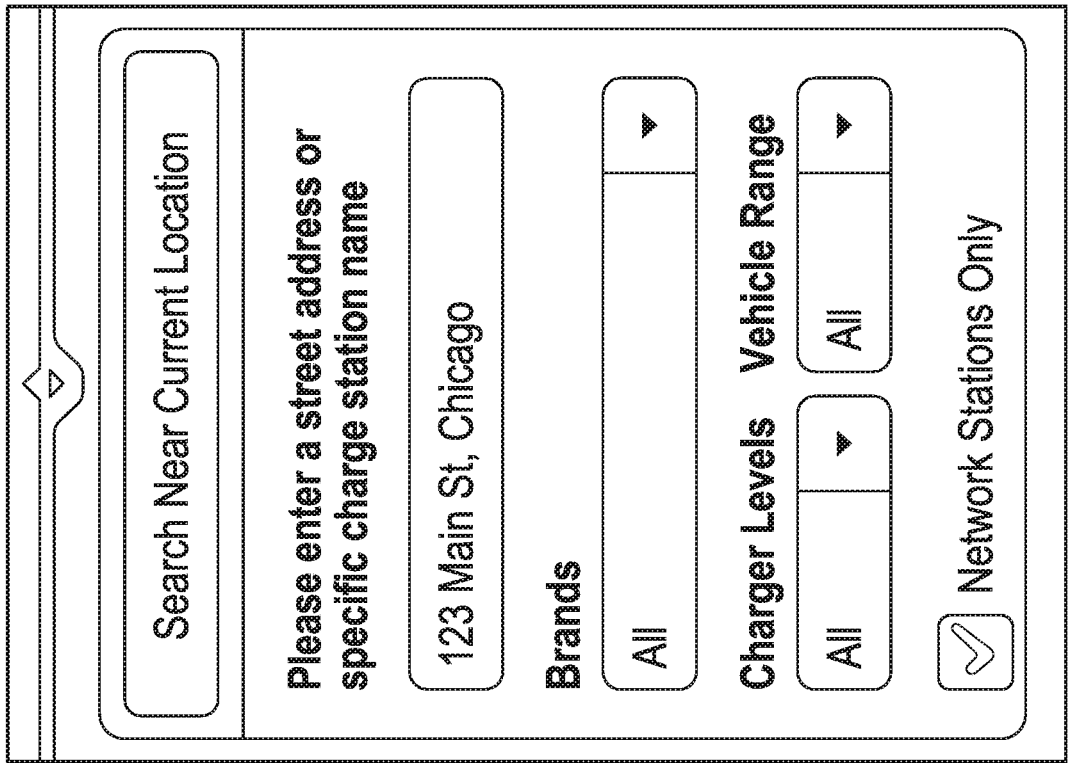
FIG. 22 is an example of a client application screen display for conducting a search for charging stations near a current location of the EV.

Referring now to FIG. 22, this screen display enables conducting a search for charging stations. One may search near a current location of the EV, or the user can enter another location, street address or a specific charge station name. FIG. 23 is a continuation of the screen display of FIG. 22 which may be accessed, for example, by scrolling. The charge station search function, in a preferred embodiment, may include specification of a charging station brand, charger levels (types of chargers) and other criteria such as network stations only, free stations only, public stations, etc. The search is enabled, in some embodiments, by interaction with the server 12 of FIG. 1, acting in communication with one or more charging stations networks (30 in FIG. 1). In some examples, the server 12 provides an aggregator function across multiple brands or networks of charging stations. It may select favorites, find best pricing, or apply other criteria including but not limited to those mentioned above.

Figure 24:
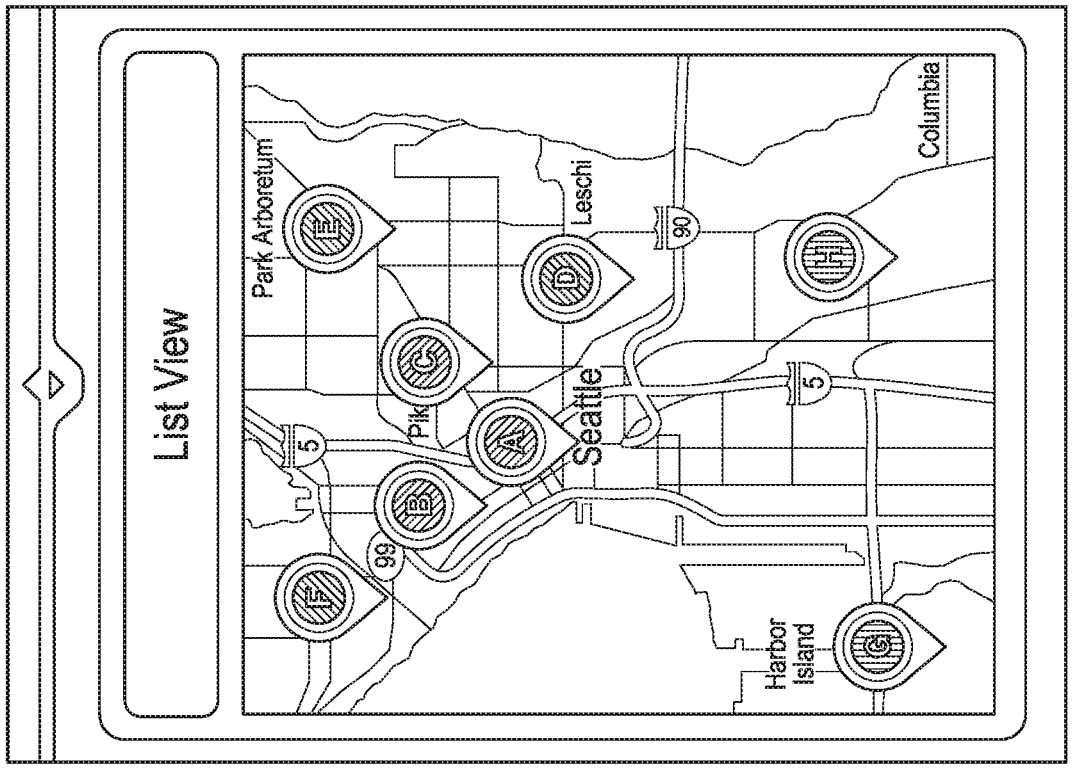
FIG. 24 is an example of a client application screen display showing a listing of charging stations found near a requested or current location.
Figure 25:
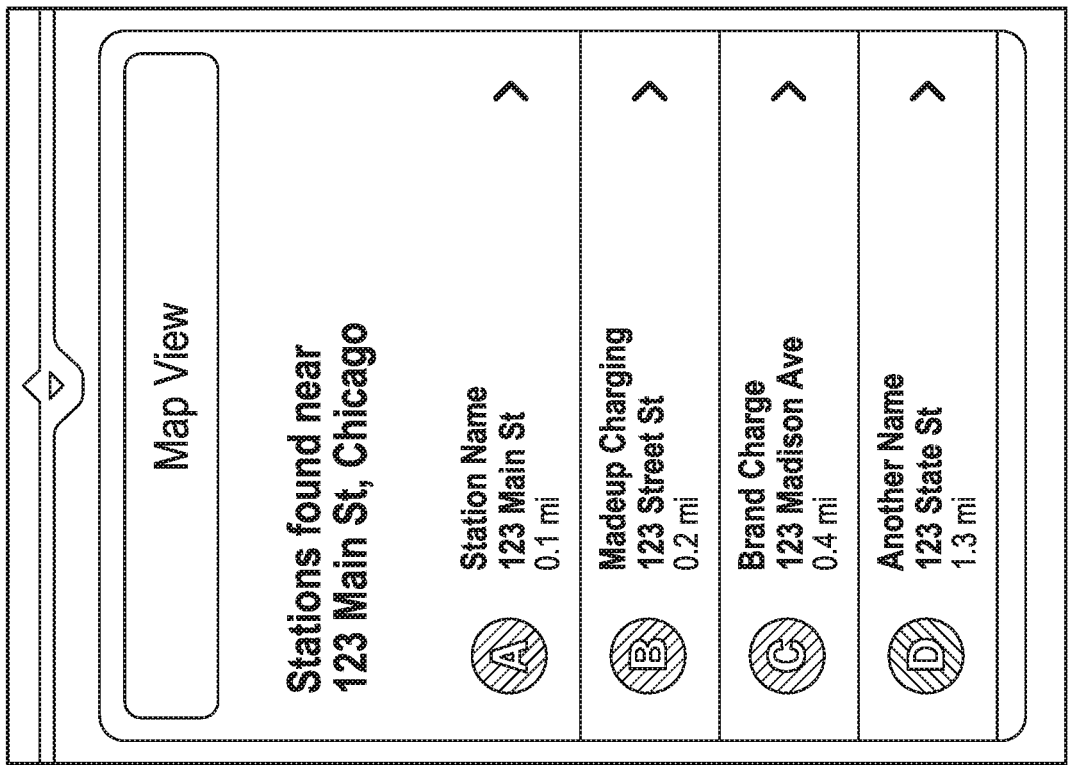
FIG. 25 is a map display showing locations of the charging stations that are listed in the display of FIG. 24.
Figure 26:
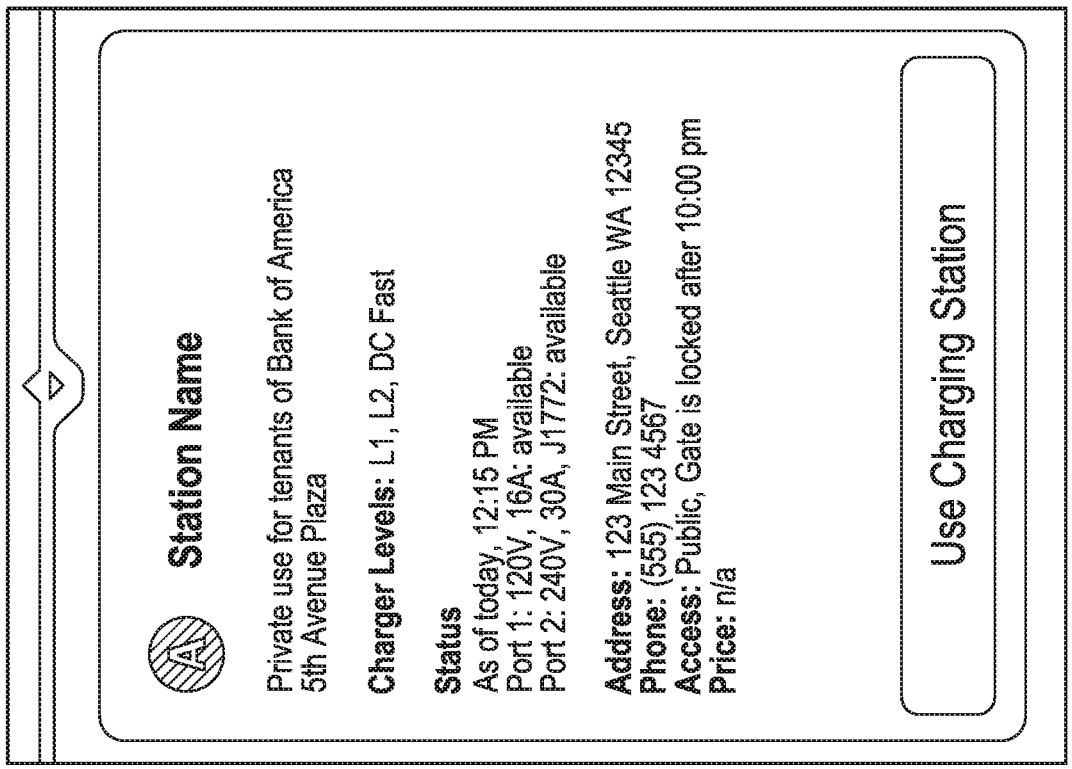
FIG. 26 is an example of a client application screen display showing details of a selected charging station, including its present status.

FIG. 24 is an example of a client application screen display showing a listing of charging stations identified by a search. FIG. 25 is a map display showing locations of the charging stations that are listed in the display of FIG. 24. Corresponding distances may be listed for each station. Brand names, and/or other indicia may be included as well, for example, current pricing or special promotions. As before, color coding may be used. From the list view or the map view, a user may select a charging station to visit. Details of the selected station may then be displayed as illustrated in the example of FIG. 26. Details may include charger levels, current status (availability for charging), location, hours, phone and access details, photos of the location, user reviews and comments.

Figure 27:
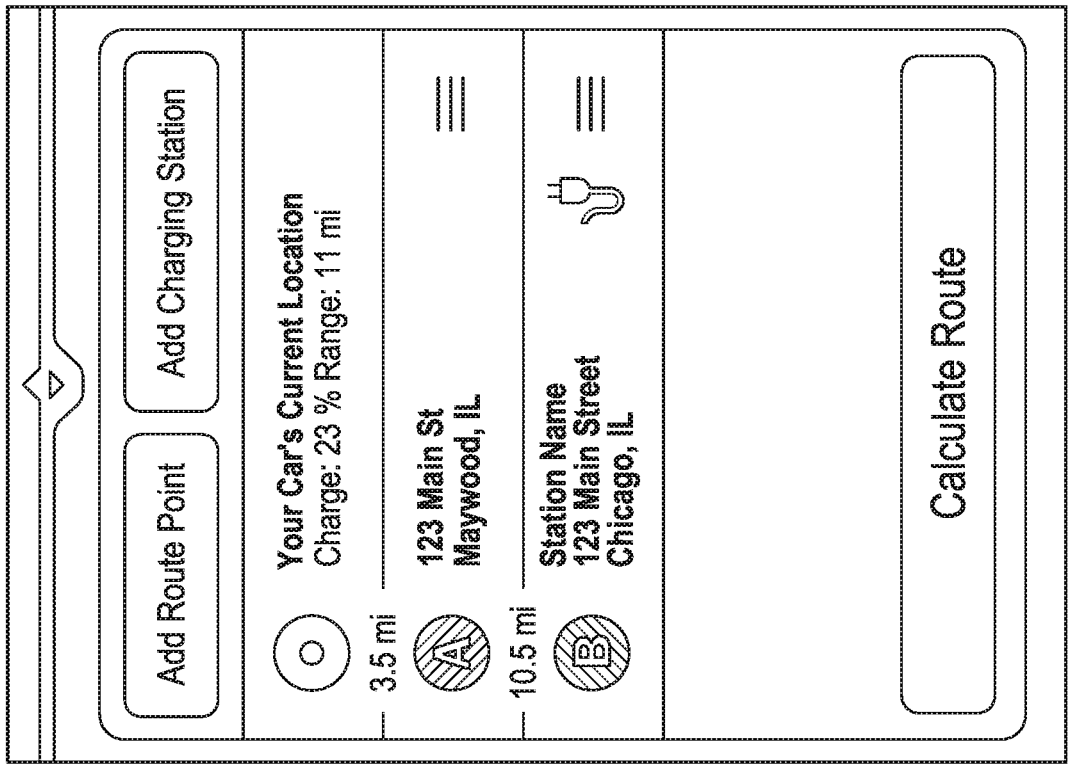
FIG. 27 is an example of a client application screen display showing the electric vehicle's current location and status, and showing route points that have been selected for a trip.

FIG. 27 shows a selected charging station added to a trip plan similar to adding a route point. In an embodiment, a user can slide route points up or down on the display screen (finger slide gesture) to reorder the trip, and then it can be recalculated. FIG. 28 is an example of a client application screen display arranged for a user to enter a home address, which may be used as an anchor point or route point. FIG. 29 illustrates adding the user's home location as a route point for a trip plan. The user's home may have charging capability. In that case, it may be listed in an eco charge profile as explained above with regard to FIG. 10.

Figure 31:
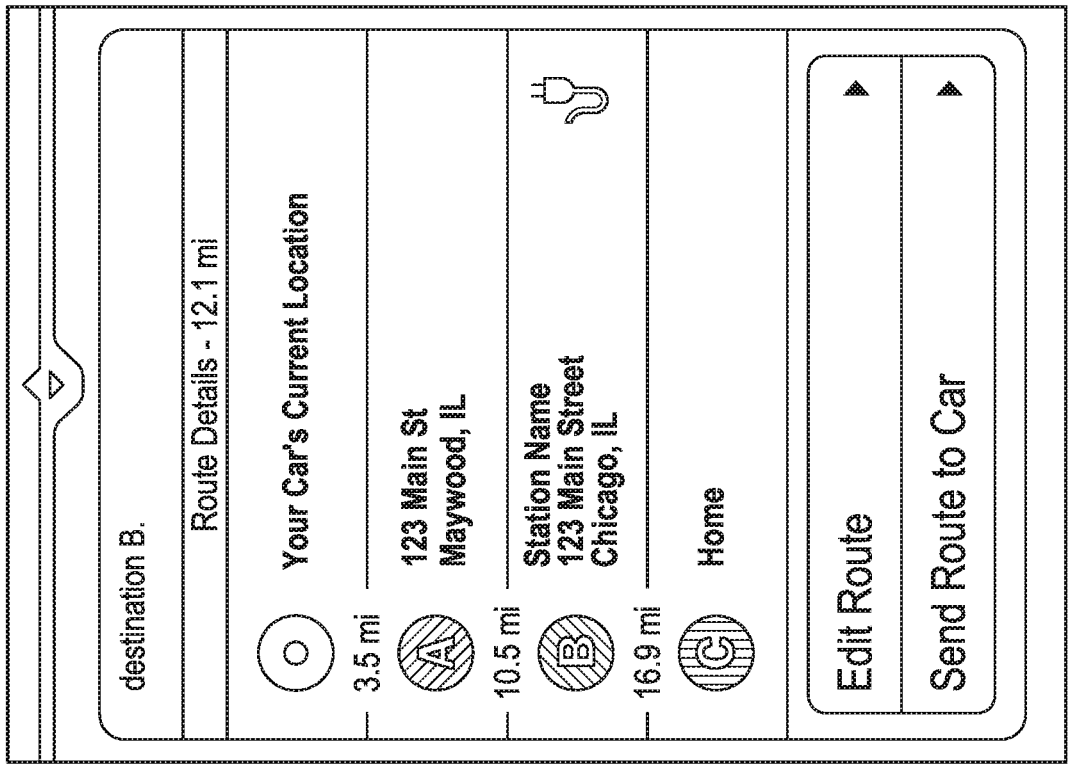
FIG. 31 is a continuation from FIG. 30 showing details of the proposed route.
Figure 30:
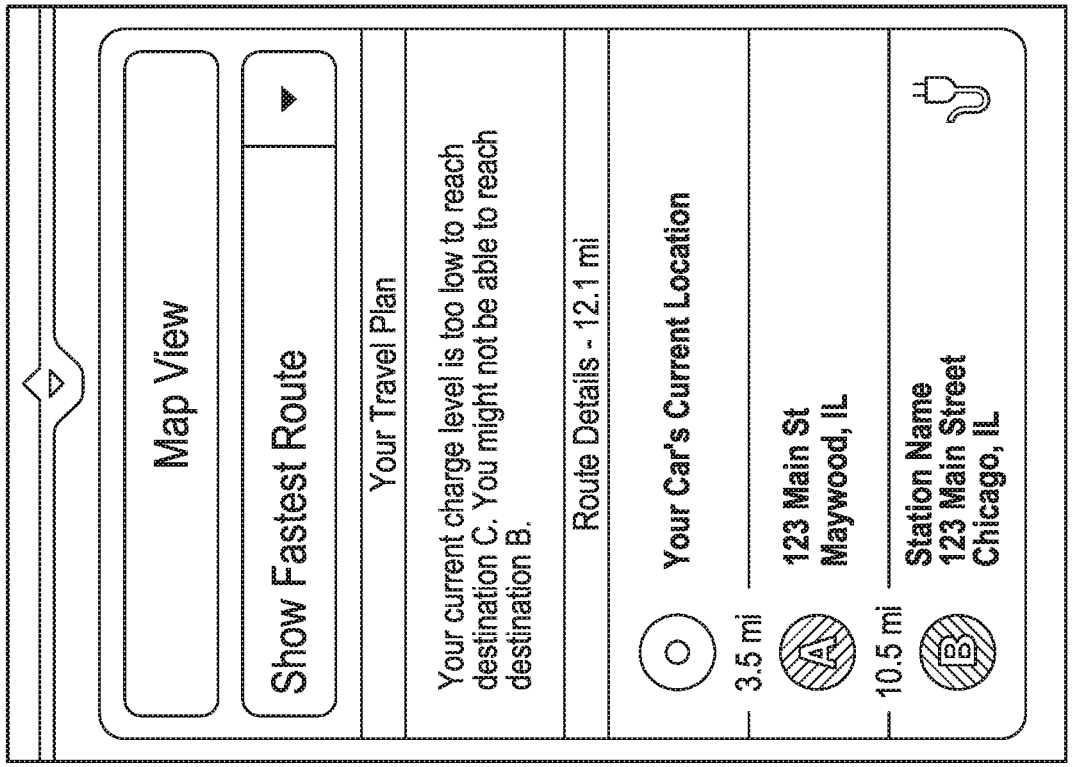
FIG. 30 is an example of a client application screen display regarding planning a proposed trip.
Figure 32:
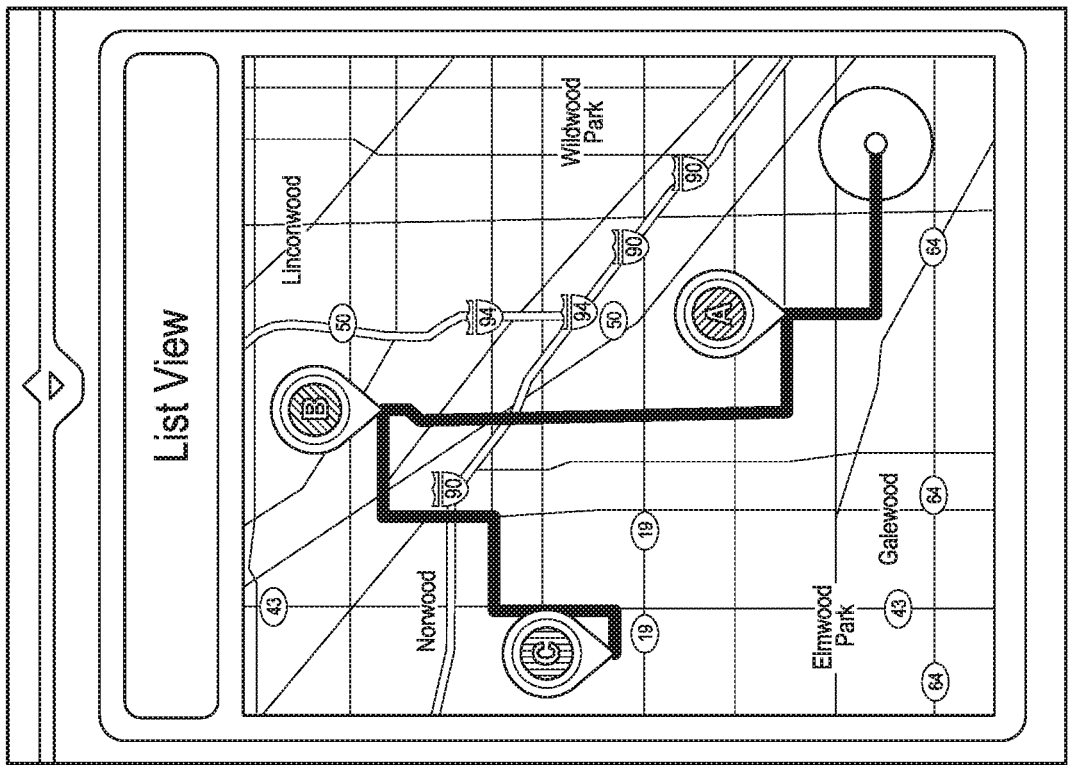
FIG. 32 is an example of a map screen display illustrating the proposed route.

FIG. 30 is an example of a client application screen display regarding planning a proposed trip. This display may result from a "calculate route" command. It provides options to switch to map view (FIG. 32). The display may indicate the vehicle's ability to reach listed destinations based on current charge level. It may show the route details, with buttons to enable editing the route, and/or sending the route to the vehicle. FIG. 31 is a continuation from FIG. 30 showing details of the proposed route. FIG. 32 is an example of a map screen display illustrating the proposed route, with a button to toggle to list view. As noted earlier, color-coding preferably is included in map views and/or list views of locations or route points.

Figure 33:
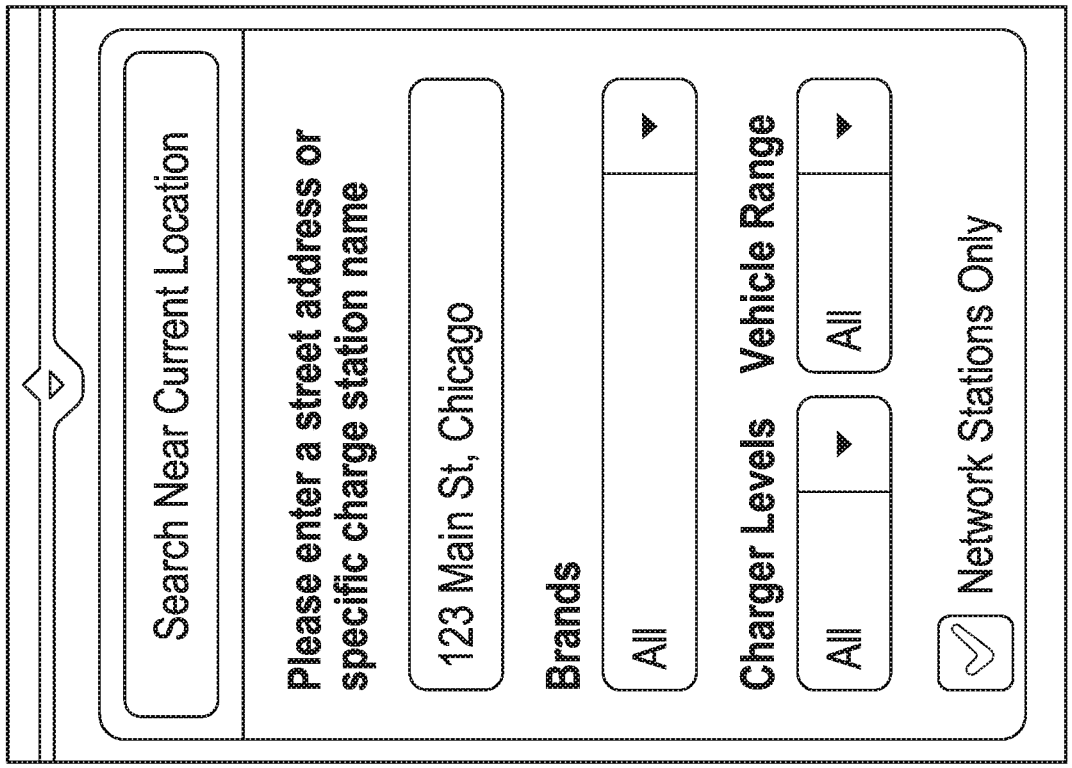
FIG. 33 is an example of a client application screen display for searching for a charging station near a defined location.
Figure 35:
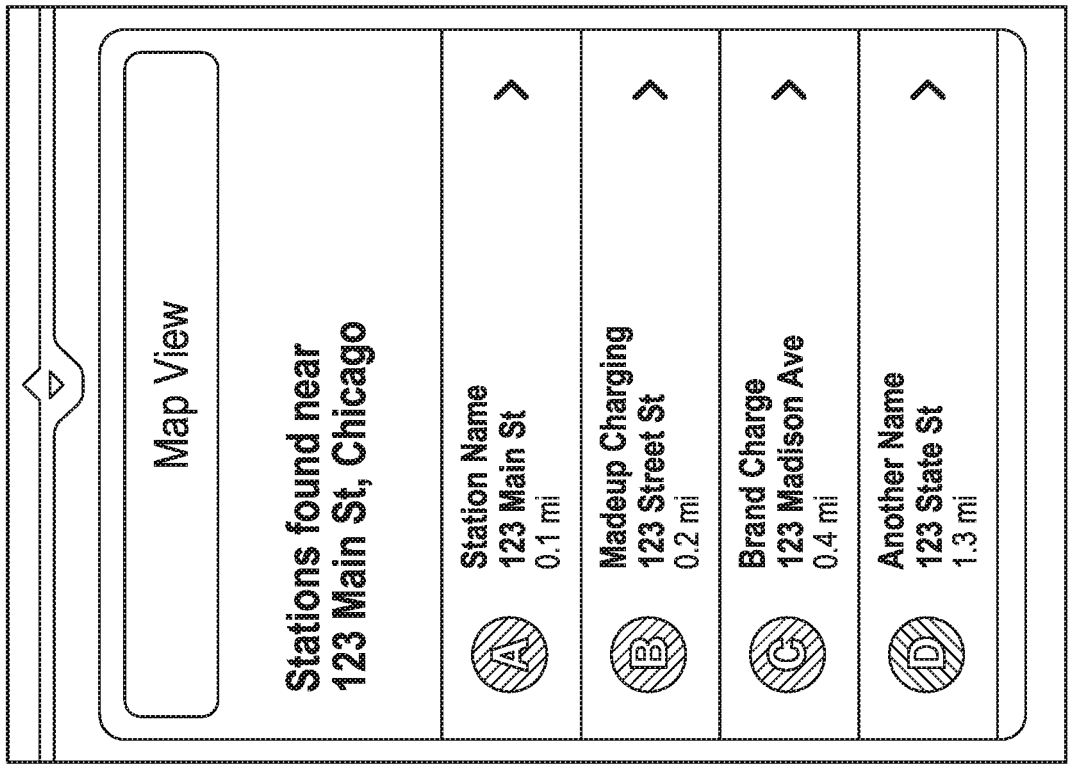
FIG. 35 is an example of a screen display showing a listing of charging stations that were found pursuant to the search defined in FIGS. 33-34.
Figure 34:
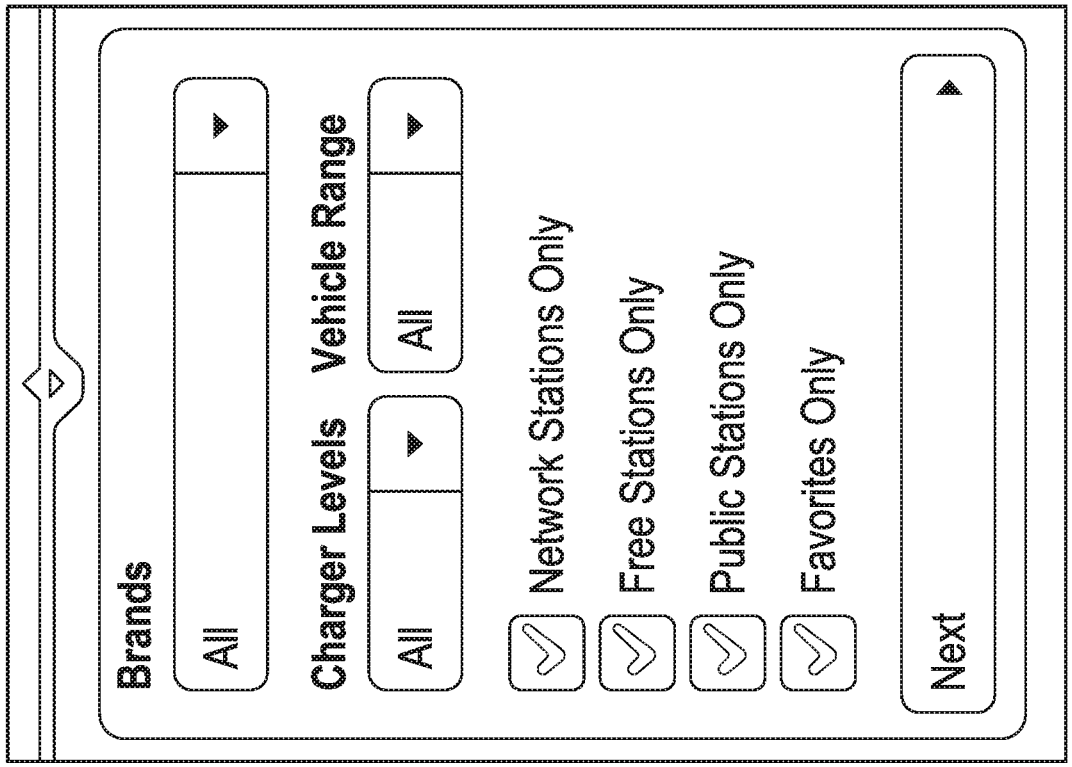
FIG. 34 is a continuation of the display of FIG. 33 showing more details for a charging station search.
Figure 36:
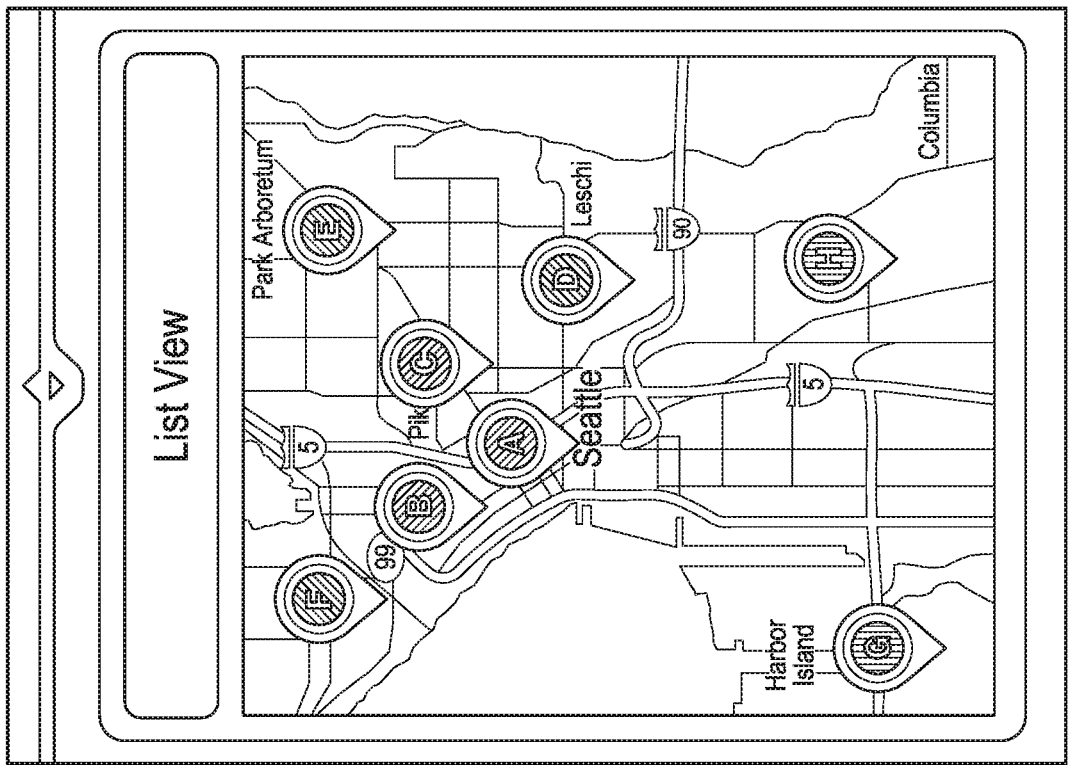
FIG. 36 is an example of a map display showing the locations of the charging stations listed in the screen display of FIG. 35.

Referring now to FIG. 33, this illustrates a search interface for finding a charging station independently of travel planning. The charging station searching feature was described above with regard to FIGS. 22-23. FIG. 34 is a continuation of the display of FIG. 33 showing more details for a charging station search. FIG. 35 is an example of a screen display showing a listing of charging stations that were found pursuant to the search defined in FIGS. 33-34. FIG. 36 is an illustration of the charging station search results in a map view.

Charging Station Reservations

Figure 37:
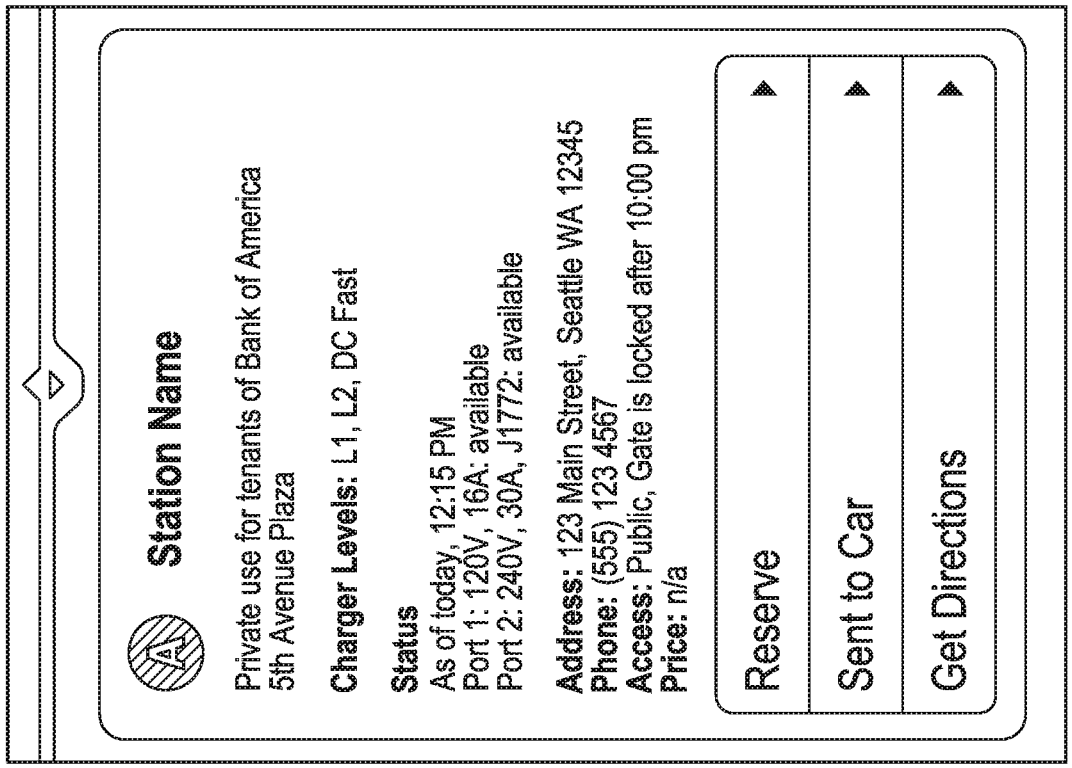
FIG. 37 is an example of a screen display showing details of a selected charging station with an option to reserve charging time at the charging station.
Figure 49:
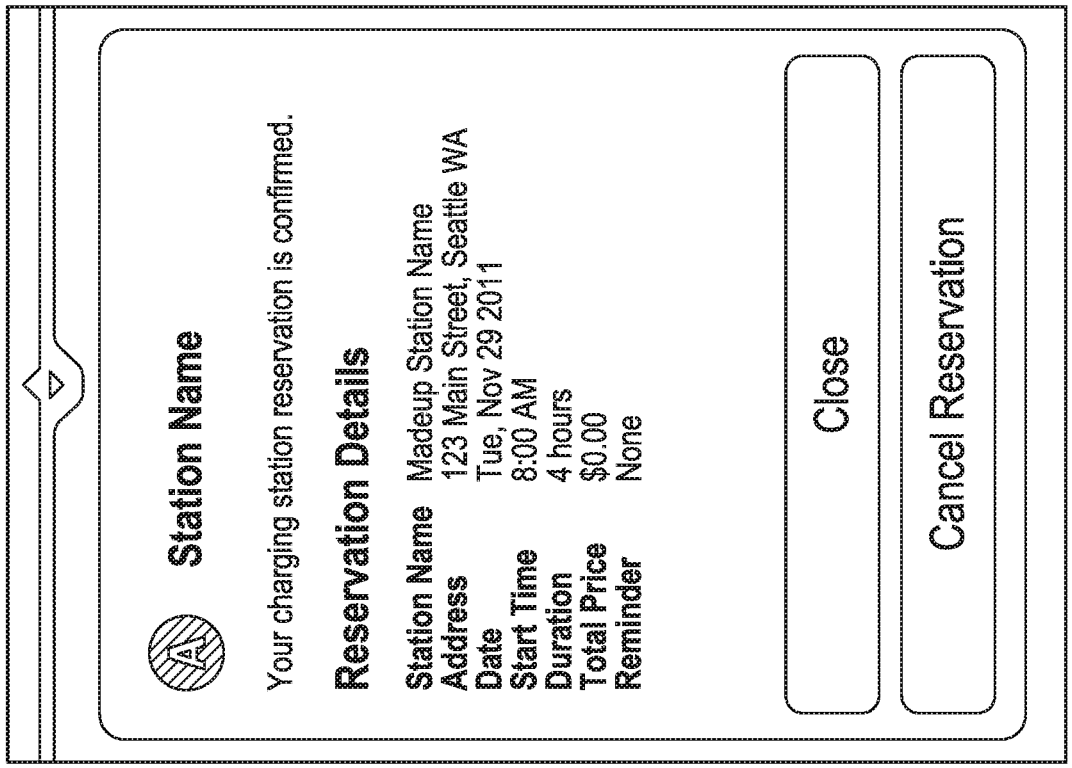
FIG. 49 is an example of a screen display confirming a charging station reservation.
Figure 48:
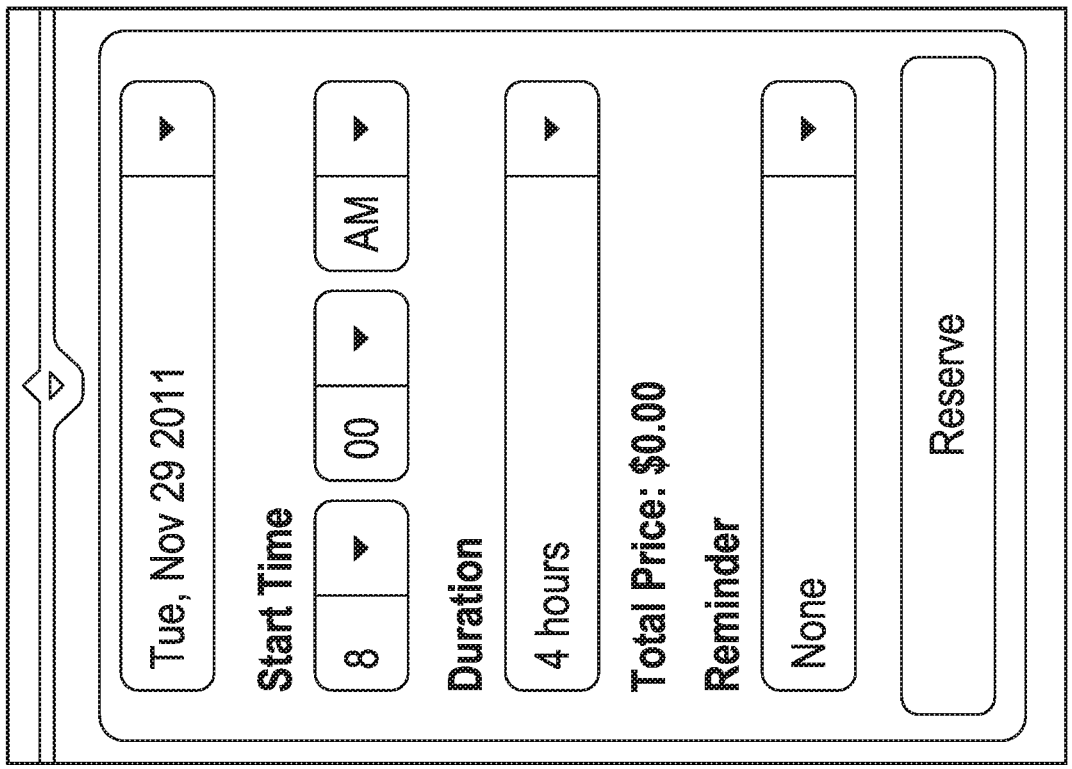
FIG. 48 is a continuation of the prior screen display for setting more details of a charging station reservation.
Figure 50:
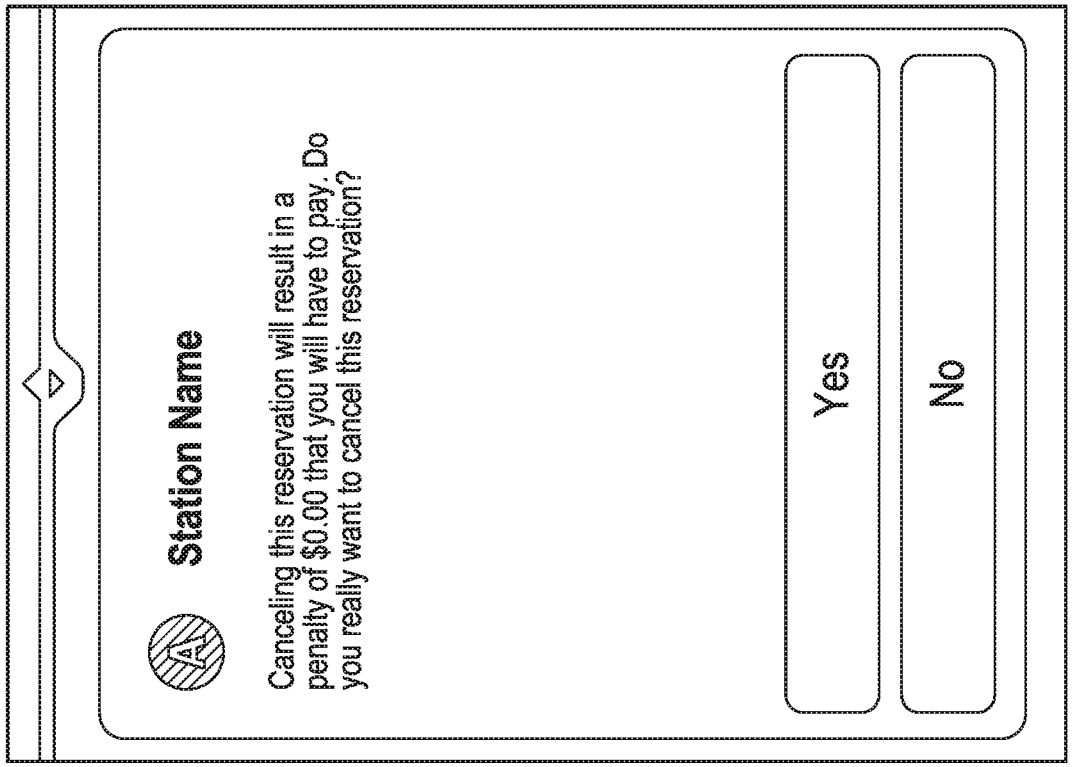
FIG. 50 is an example of a screen display related to canceling a reservation at an EV charging station.

FIG. 37 is an example of a screen display showing details of a selected charging station, as mentioned above, with an option to reserve charging time at the charging station. FIG. 47 is an example of a client application screen display for making a reservation at the selected charging station identified in FIG. 37. To do so, the user may log into a pre-established account with a username and password. A date is selected for the charging reservation, along with a charging start time and duration. FIG. 48 is a continuation of the prior screen display. The client application may indicate a price for the charging session. It may obtain this information from the charging network, or via the central server. The client app may provide for a reminder. In a presently preferred implementation, the central server implements the charging reservation feature by interaction with a charging station network, for example using an API. A "Reserve" button on the app display screen may be used to make the reservation. FIG. 49 shows an example of a screen display confirming a charging station reservation, and showing the reservation details. FIG. 50 is an example of a screen display for canceling a reservation at an EV charging station. In some cases, a penalty may be charged for canceling a reservation.

Commuting Assistance for EV

Figure 38:
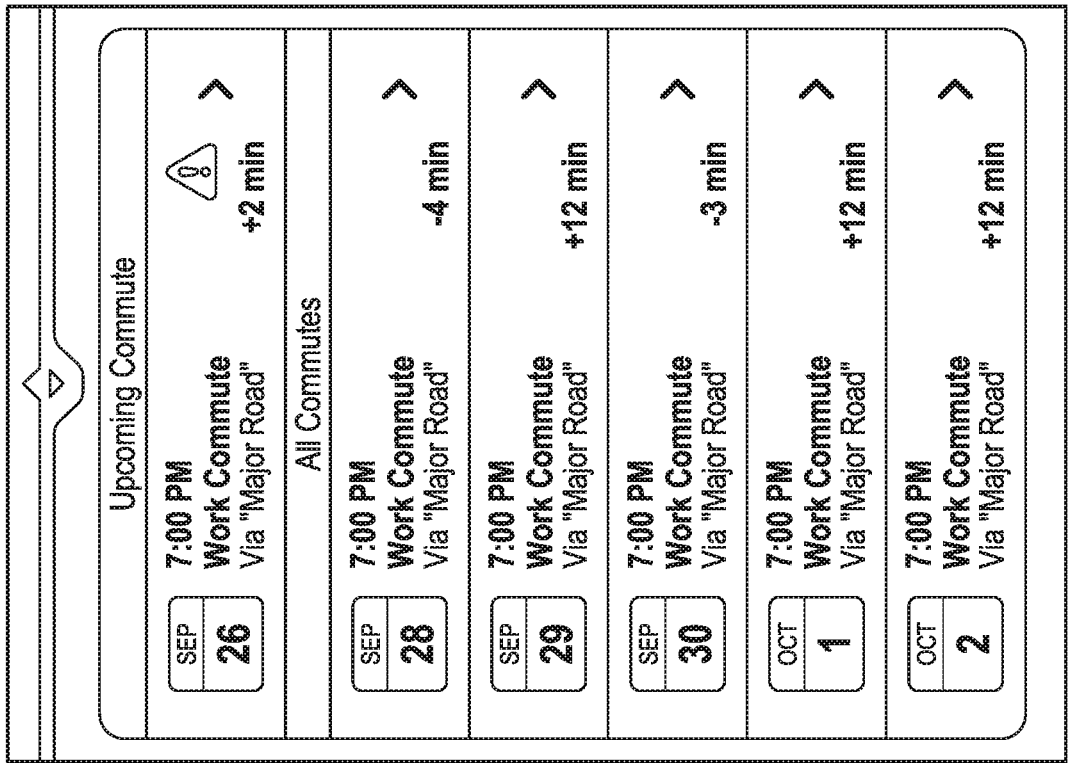
FIG. 38 is an example of a client application screen display showing an upcoming commute and a series of stored commutes, along with travel time information based on current and statistically projected traffic conditions.

FIG. 38 is an example of a client application screen display showing an upcoming commute and a series of stored commutes, along with travel time for each commute based on traffic conditions. In case of heavy or slow traffic along the upcoming commute route, the system may recommend an alternate route or departure time. Traffic and route information may be provided via the server.

Figure 51:
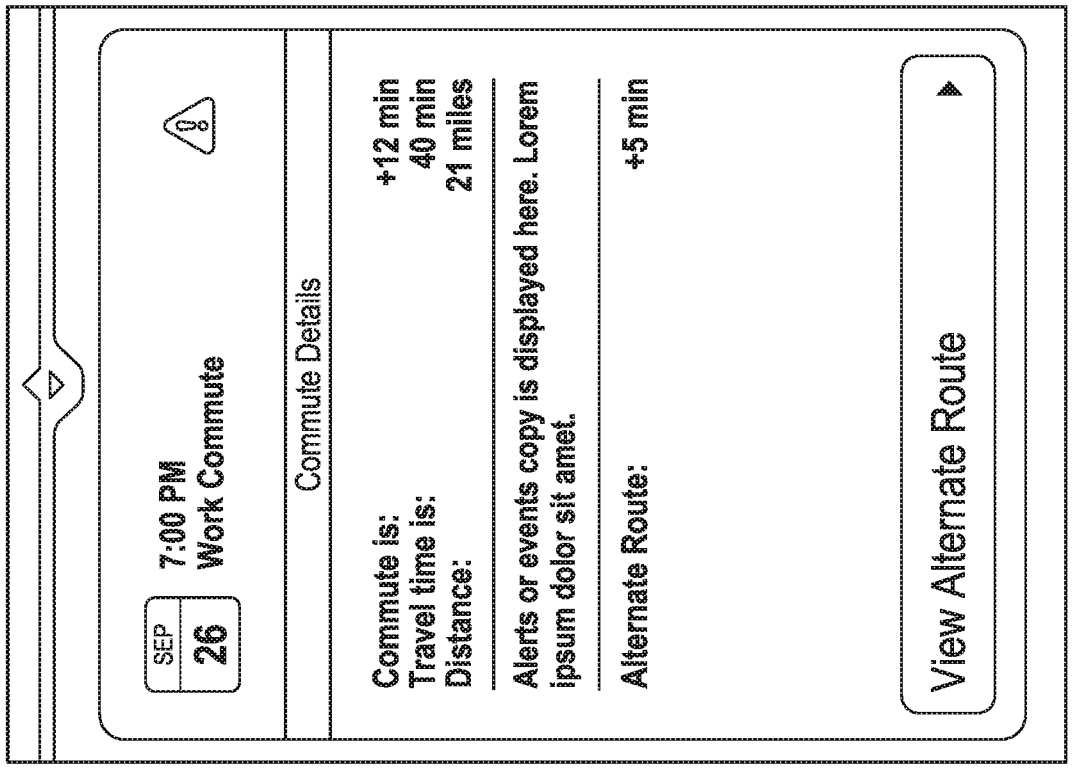
FIG. 51 is an example of a client application screen display regarding a stored commute to work, with information on travel time and an alternate route.

FIG. 51 is an example of a client application screen display regarding a stored commute to work, with information on travel time and an alternate route. An alternate route may be one created by the system to present the driver with a time saving option. Such alternate routes may be evaluated for energy demands and presented only if the EV has sufficient battery reserves.

Figure 53:
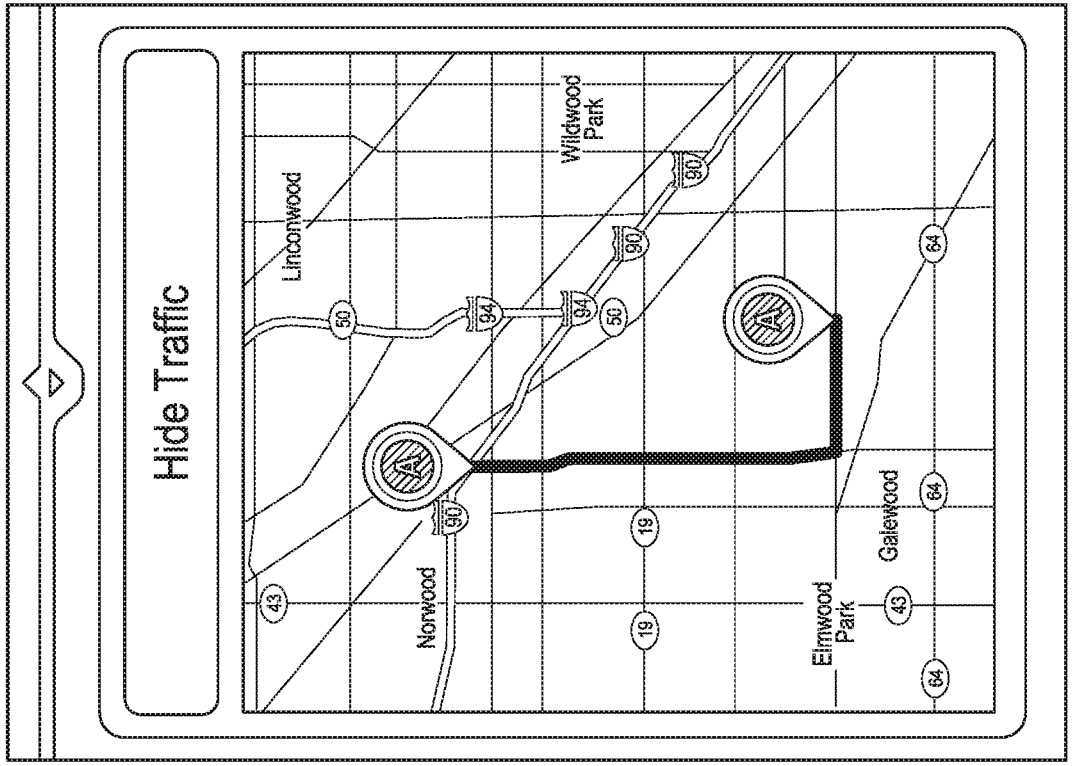
FIG. 53 is an example of a screen display of the map of FIG. 52 showing an indication of traffic conditions.
Figure 52:
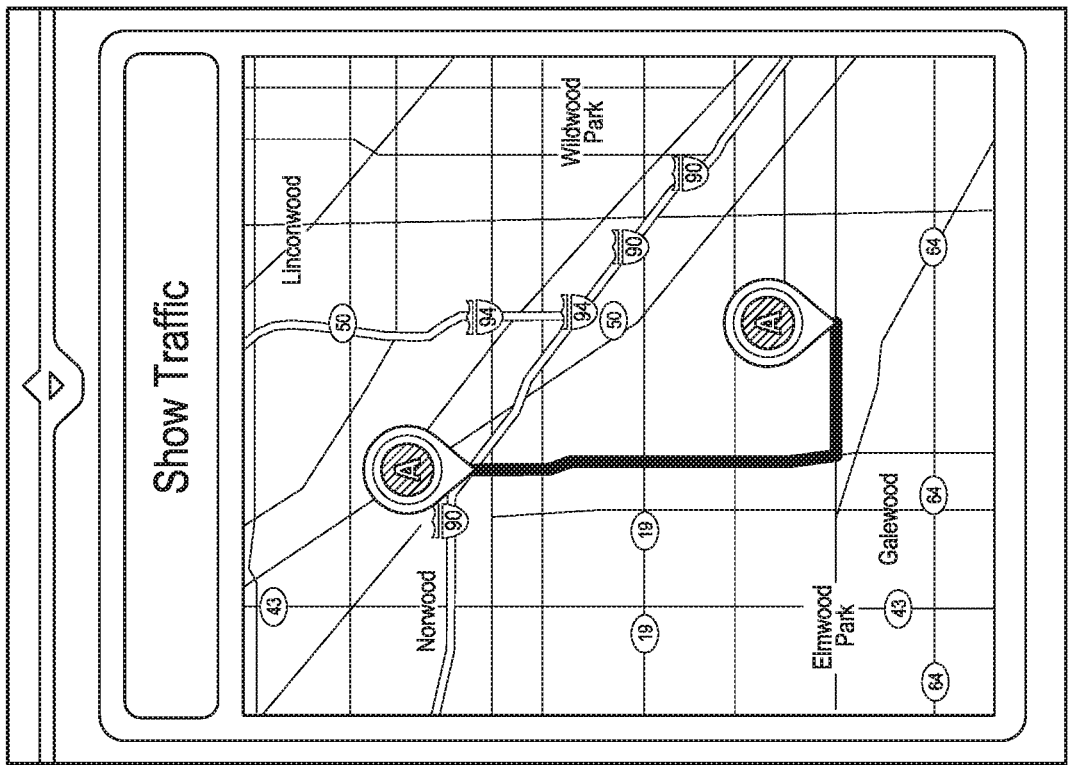
FIG. 52 is an example of a map display illustrating a proposed route.

FIG. 52 is an example of a map display illustrating an alternate route responsive to the button on FIG. 51, with a button to show traffic. FIG. 53 is an example of a screen display of the map of FIG. 52 including an indication of traffic conditions, for example, by using color.

Figure 39:
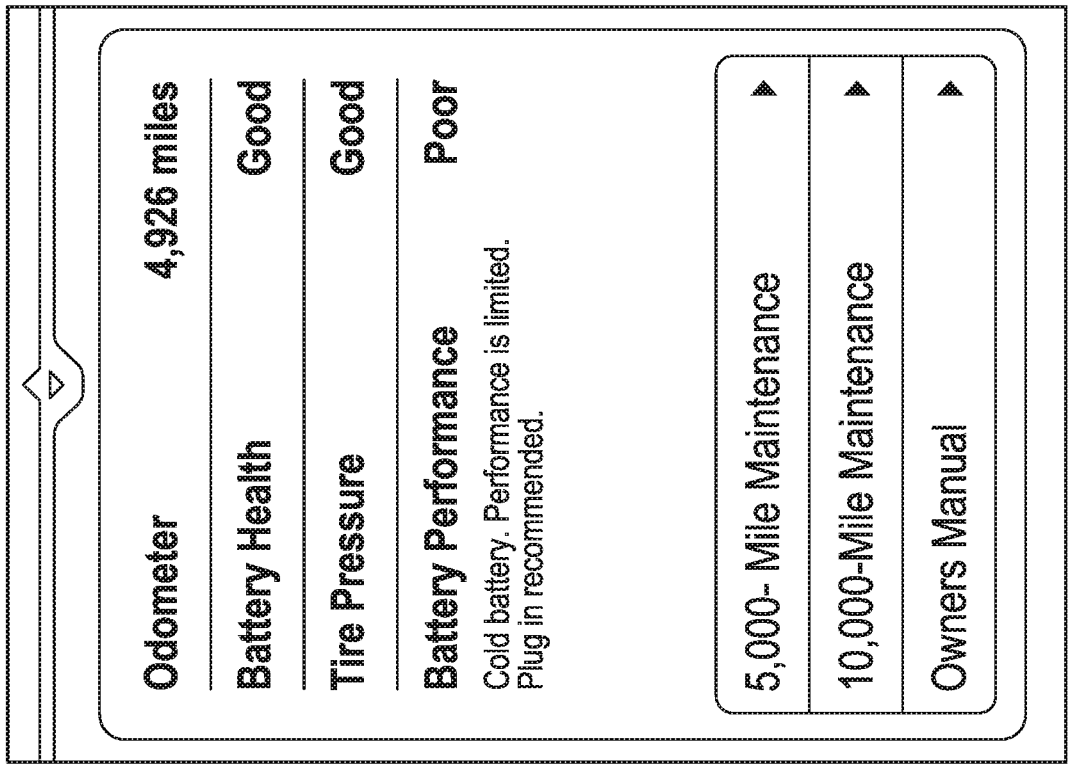
FIG. 39 is an example of a client application screen display showing a health report for the electric vehicle.
Figure 40:
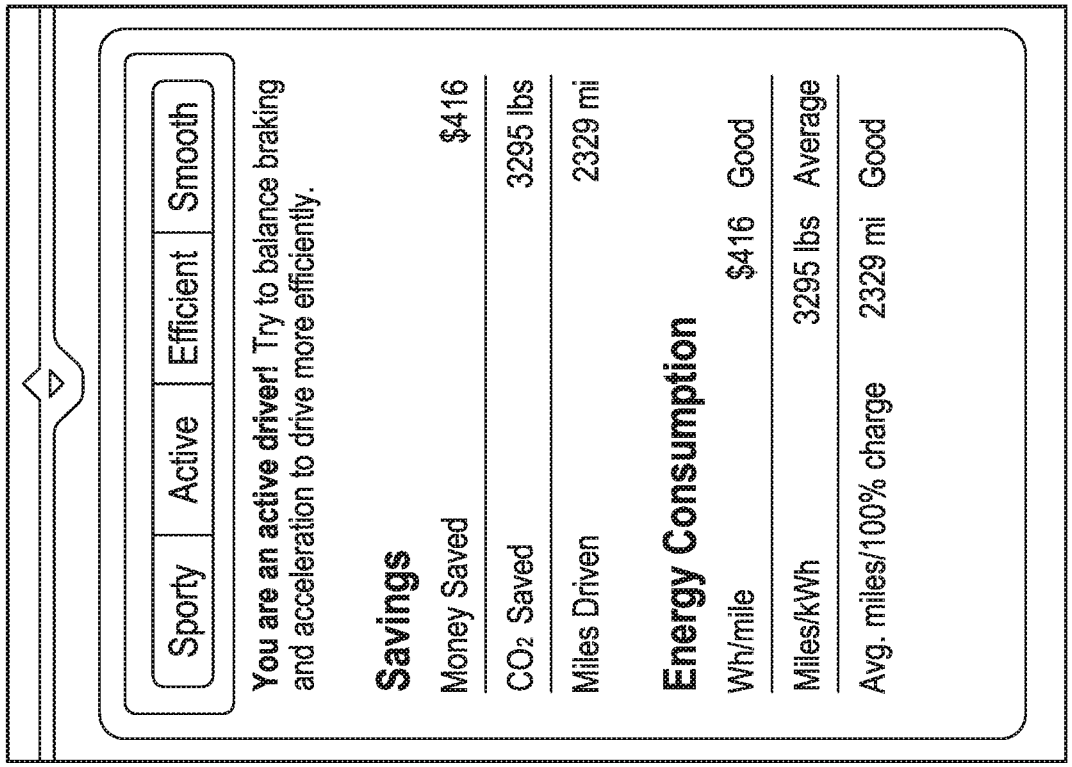
FIG. 40 is an example of a client application screen display showing information about a user's driving style based on a history of trips, and displaying information reflecting monetary savings and energy consumption.

FIG. 39 is an example of a client application screen display showing a health report for the electric vehicle. FIG. 40 is an example of a client application screen display showing information about a user's driving style, which preferably is based on a history of trips, and displaying information reflecting monetary savings and energy consumption for the subject vehicle. This type of report can be generated by the server using the history database described above.

Figure 41:
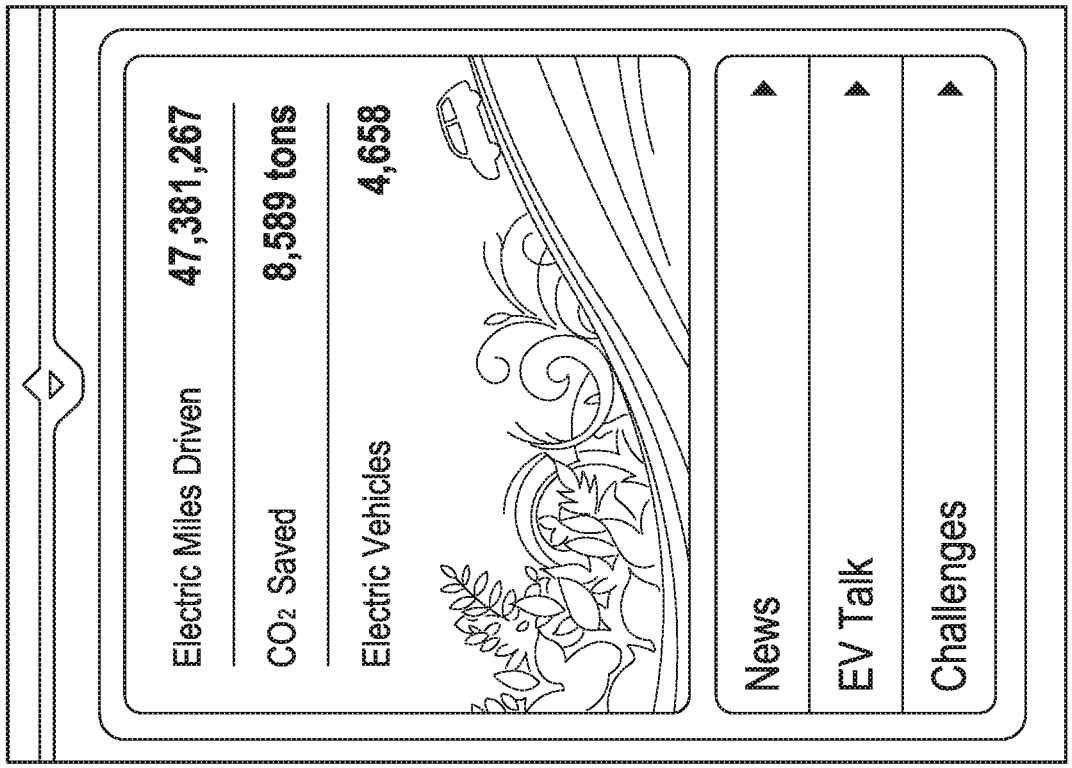
FIG. 41 is an example of screen display showing aggregated information for a given group or fleet of electric vehicles.
Figures 42, 43:
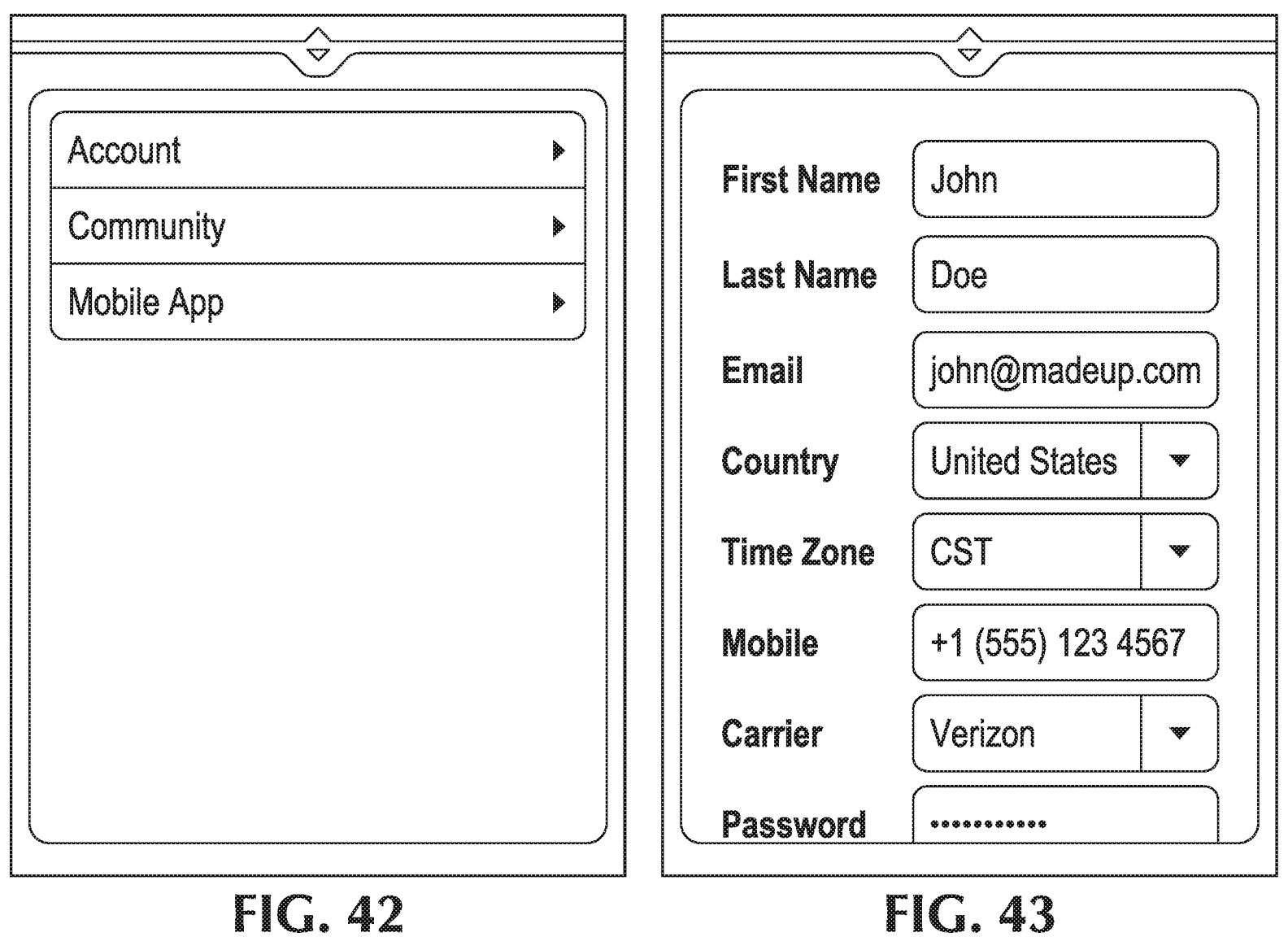

FIG. 41 is an example of screen display showing aggregated information for a given group, model or fleet of electric vehicles. FIG. 42 is an example of a client application screen display for managing a user's account and other operations.

FIGS. 43-45 enable maintaining a user profile. FIG. 46 is an example of a screen display for updating a user password for a mobile application account.

Figure 54:
FIG. 54 is an example of a web page interface to a server for electric vehicle services.

FIG. 54 is an example of a web page interface for electric vehicle services. The various features illustrated in FIG. 54 were described above with regard to a smart phone user interface.

It will be obvious to those having skill in the art that many changes may be made to the details of the above-described embodiments without departing from the underlying principles of the invention. The scope of the present invention should, therefore, be determined only by the following claims.

The invention claimed is:

1. A computer-implemented method comprising:
   storing historical driving data for an electric vehicle (EV) in a memory, the driving data reflecting a plurality of driving trips of the EV;
   including in the historical driving data, for each driving trip of the plurality of driving trips of the EV, at least data indicating a distance traveled, a corresponding change in vehicle charge level, and a date or day of the week:
   in a processor, analyzing the historical driving data to determine a user's driving style; and
   displaying a driving range estimate on an electronic display screen, wherein the displayed driving range estimate is calculated based on the user's driving style.

2. The computer-implemented method of claim 1 and further comprising:
   in the processor, analyzing the historical driving data to determine a monetary savings; and
   displaying an indication of the monetary savings on the electronic display screen.

3. The computer-implemented method of claim 1 and further comprising:
   including temperature data in the historical driving data for the EV;
   determining a current local temperature;
   comparing the current local temperature to an average temperature reflected in the historical driving data to determine an expected energy usage of the EV; and
   displaying an indication of readiness status for the EV on the electronic display screen responsive to the said temperature comparison.

4. The computer-implemented method of claim 1 and further comprising:
   analyzing the historical driving data for the EV to determine a battery charge-discharge profile for the EV.

5. The computer-implemented method of claim 1 and further comprising:
   providing a server computer;
   arranging the server computer for communications with the EV to acquire the historical driving data from the EV and to determine a current charge level of the EV;
   determining the user's driving style in the server computer;
   further arranging the server computer for communications with a client device, wherein the electronic display screen comprises an electronic display screen of the client device; and
   transmitting data about the driving range estimate from the server computer to the client device for display of the driving range estimate on the electronic display screen of the client device.

6. The computer-implemented method of claim 5 wherein the client device comprises a smart phone or tablet computing device.

7. The computer-implemented method of claim 5 wherein the client device comprises a head unit of the EV.

8. The computer-implemented method of claim 5 and further comprising:
including vehicle speed versus time data and identification of a driver in the acquired historical driving data for the EV; and
analyzing the historical driving data at the server computer to determine an acceleration and braking profile for the identified driver of the EV.

9. The computer-implemented method of claim 1 and further comprising:
providing a server computer;
providing an application program executable on a client device and arranged to acquire the historical driving data from the EV; and
transmitting the acquired historical driving data from the client device to the server computer for storage in a database of historical driving data for the EV.

10. The computer-implemented method of claim 9 wherein:
the analyzing the historical driving data to determine the user's driving style is carried out in the server computer, and results of the analyzing are communicated from the server computer to the client device.

11. The computer-implemented method of claim 1 and further comprising:
in the processor, analyzing the historical driving data to determine energy savings; and displaying an indication of the energy savings on the electronic display screen.

12. The computer-implemented method of claim 1 and further comprising:
providing a server computer;
arranging the server computer for communications with the EV to acquire the historical driving data from the EV and to determine a current charge level of the EV;
determining estimated energy savings in the server computer based on the historical driving data;
further arranging the server computer for communications with a client device, wherein the electronic display screen comprises an electronic display screen of the client device; and
transmitting estimated energy savings from the server computer to the client device for display of an indication of the estimated energy savings on the electronic display screen of the client device.

13. A computer-implemented method comprising:
storing historical driving data for an electric vehicle (EV) in a memory, the driving data reflecting a plurality of driving trips of the EV;
including in the historical driving data, for each driving trip of the plurality of driving trips of the EV, at least data indicating a distance traveled, a corresponding change in vehicle charge level, and a date or day of the week;
in a processor, analyzing the historical driving data to determine a user's driving style; and
displaying a comparison of an energy usage estimate with a current charge level of the EV on an electronic display screen, wherein the energy usage estimate corresponds to a given time period and is calculated based on the user's driving style.

14. The computer-implemented method of claim 13 and further comprising:
providing a server computer;
arranging the server computer for communications with the EV to acquire the historical driving data from the EV and to determine a current charge level of the EV;
determining the user's driving style in the server computer;
further arranging the server computer for communications with a client device, wherein the electronic display screen comprises an electronic display screen of the client device; and
transmitting data about the energy usage estimate from the server computer to the client device for display of the energy usage estimate on the electronic display screen of the client device.

15. The computer-implemented method of claim 14, wherein the client device is arranged to remotely control a component of the EV.

16. The computer-implemented method of claim 14, wherein the client device is arranged to transmit a signal that causes the EV to begin charging so long as the EV is plugged into a utility power source.

17. The computer-implemented method of claim 16, wherein the client device includes a user interface selectable by a person to cause the client device to transmit the signal.

18. The computer-implemented method of claim 17, wherein the client device displays the comparison co-located with the user interface.

19. The computer-implemented method of claim 14 and further comprising:
providing an application program executable on the client device and arranged to acquire the historical driving data from the EV; and
transmitting the acquired historical driving data from the client device to the server computer for storage in a database of historical driving data for the EV.

20. The computer-implemented method of claim 19, wherein the client device comprises: a mobile device in communication with the EV, or an interface installed in the EV.

* * * * *